US012607327B2

(12) United States Patent
Zhang

(10) Patent No.: US 12,607,327 B2
(45) Date of Patent: Apr. 21, 2026

(54) STARRY SKY PROJECTION DEVICE WITH NEBULA LENS AND STARRY SKY GENERATION METHOD

(71) Applicant: Guihua Zhang, Shenzhen (CN)

(72) Inventor: Guihua Zhang, Shenzhen (CN)

( * ) Notice: Subject to any disclaimer, the term of this patent is extended or adjusted under 35 U.S.C. 154(b) by 99 days.

(21) Appl. No.: 18/629,839

(22) Filed: Apr. 8, 2024

(65) Prior Publication Data

US 2025/0314369 A1 Oct. 9, 2025

(51) Int. Cl.
*F21V 14/06* (2006.01)
*F21V 5/00* (2018.01)

(52) U.S. Cl.
CPC .............. *F21V 14/06* (2013.01); *F21V 5/002* (2013.01)

(58) Field of Classification Search
CPC ........... F21V 5/008; F21V 5/002; F21V 14/06
See application file for complete search history.

(56) References Cited

U.S. PATENT DOCUMENTS

| | | | | |
|---|---|---|---|---|
| 11,353,183 | B1 * | 6/2022 | Zhang | F21V 5/04 |
| 2017/0321850 | A1 * | 11/2017 | Chien | F21K 9/60 |
| 2019/0120450 | A1 * | 4/2019 | Chien | F21V 13/02 |
| 2022/0381412 | A1 * | 12/2022 | Ge | F21V 3/049 |
| 2023/0265989 | A1 * | 8/2023 | Liu | F21V 5/007 362/269 |
| 2024/0087477 | A1 * | 3/2024 | Li | G09B 27/04 |
| 2025/0012427 | A1 * | 1/2025 | Fu | F21V 14/08 |

* cited by examiner

*Primary Examiner* — Eric T Eide
(74) *Attorney, Agent, or Firm* — Hawaii Patent Services; Nathaniel K. Fedde; Kenton N. Fedde

(57) ABSTRACT

The present invention relates to a starry sky projection device with a nebula lens and a starry sky generation method, which comprises a nebula lens with a light-emitting area, wherein a variation part is added on the nebula lens, and the variation part defines a variation area, and the variation area generates image variation different from the light-emitting area; and a varied nebula and accompanying stars are generated by adding a light source and a diffractive optical element, so as to form a varied projected starry sky.

20 Claims, 27 Drawing Sheets

STARRY SKY PROJECTION DEVICE WITH NEBULA LENS AND STARRY SKY GENERATION METHOD

TECHNICAL FIELD

The present invention relates to the technical field of projection, and in particular to a starry sky projection device with a nebula lens and a starry sky generation method.

BACKGROUND

Projection is a technology with a long history, which has become an indispensable part of people's lives since its birth. With the continuous improvement of people's living standards and the progress and development of projection technology, people began to pursue a better life experience, so a variety of starry sky projections appeared in the market.

The patent document with a publication number of U.S. Pat. No. 11,378,879B1 discloses a starry sky projection lamp and a nebula generation method thereof, which comprises an interference sheet capable of generating a nebula effect, a beam generator and a reflecting member respectively arranged at two sides of the interference sheet, and at least one first lens, wherein the light emitted from the beam generator passes through the interference sheet and the reflecting member and then passes through the first lens to form a nebula, and a motor drives the interference sheet to rotate, so that the nebula has a dynamic property.

In the patent document with publication number of U.S. Pat. No. 8,057,045B2, a star field projector is disclosed, which includes a device for generating a cloud-like effect by using at least one incoherent light source, a device for generating a moving star field by using at least one coherent light source, and a device for adjusting and supplying electric power. The device for generating cloud-like effect by using at least one incoherent light source comprises at least one pair of condenser lenses and an interference filter wheel rotated by a motor, which is arranged between the at least one pair of condenser lenses; the star field projector also comprises a grating wheel for generating stars, a coherent light source and a diffractive optical element arranged between the two; and the grating wheel is driven by the motor to rotate so as to move the stars.

Because the methods of generating nebulae in this technical field mostly adopt the methods in the above patents, and the nebulae are generated by projecting light sources onto interference plates and then passing through external condenser lenses, this method of generating nebulae and the effects presented by nebulae are almost same. In addition, although nebulae and stars are dynamic, there is no internal relationship between their dynamic movements, which makes the generated starry sky monotonous, and does not conform to the real situation in which the stars and clouds in the real starry sky move around giant sources (such as black holes). It has been unable to meet people's more and higher perception needs.

SUMMARY

The present invention provides a nebula lens, which includes at least one main structure and at least one opening arranged on the main structure, wherein the main structure is a rotating body, and the main structure has at least one outer surface and at least one inner surface; and the main structure has a tendency to protrude away from the opening, the inner surface defines at least one cavity, and the outer surface defines at least one light-emitting area, and the light-emitting area faces away from the opening; and the main structure is provided with at least one layer of nebula pattern and at least one variation part, and the variation part defines at least one variation area, and the variation area faces away from the opening; and the variation area generates image changes different from the light-emitting area.

The present invention further provides a starry sky projection device with a nebula lens, comprising at least one nebula lens, at least one incoherent light source and at least one coherent light source, wherein the nebula lens is provided with at least one diffractive optical element; and wherein the incoherent light source generates incoherent light, which irradiates the nebula lens, and the coherent light source generates coherent light, which irradiates the diffractive optical element; and the nebula lens comprises at least one main structure and at least one opening arranged on the main structure, wherein the main structure is a rotating body and has at least one outer surface and at least one inner surface; and the main structure has a tendency to protrude away from the opening, the inner surface defines at least one cavity, and the outer surface defines at least one light-emitting area, and the light-emitting area faces away from the opening; and the main structure is provided with at least one layer of nebula pattern and at least one variation part, and the variation part defines at least one variation area, which faces away from the opening and generates image changes different from the light-emitting area.

The present invention further provides a method for generating starry sky, comprising providing at least one nebula lens and at least one incoherent light source, wherein the incoherent light source generates incoherent light, and the incoherent light irradiates the nebula lens, and the nebula lens comprises at least one main structure and at least one opening arranged on the main structure, wherein the main structure is a rotating body, and the main structure has at least one outer surface and at least one inner surface; the main structure has a tendency to protrude away from the opening, the inner surface defines at least one cavity, and the outer surface defines at least one light-emitting area; the light-emitting area faces away from the opening, the main structure is provided with at least one layer of nebula pattern and at least one variation part; the variation part defines at least one variation area, the variation area faces away from the opening, and the variation area generates image changes different from the light-emitting area; and the method for generating starry sky comprises the following steps:

activating the incoherent light source to generate the incoherent light;

irradiating the incoherent light to the nebula pattern and the variation part;

passing the incoherent light through the nebula lens; and irradiating the incoherent light to a surface of a projected object to form a starry sky composed of varied nebulae.

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the detailed description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

BRIEF DESCRIPTION OF DRAWINGS

In order to explain the technical scheme of this application more clearly, the drawings needed in the implementation will be briefly introduced below. Obviously, the drawings described below are only some implementations of this application. For those skilled in the art, other drawings can be obtained according to these drawings without creative work.

Figure 1:
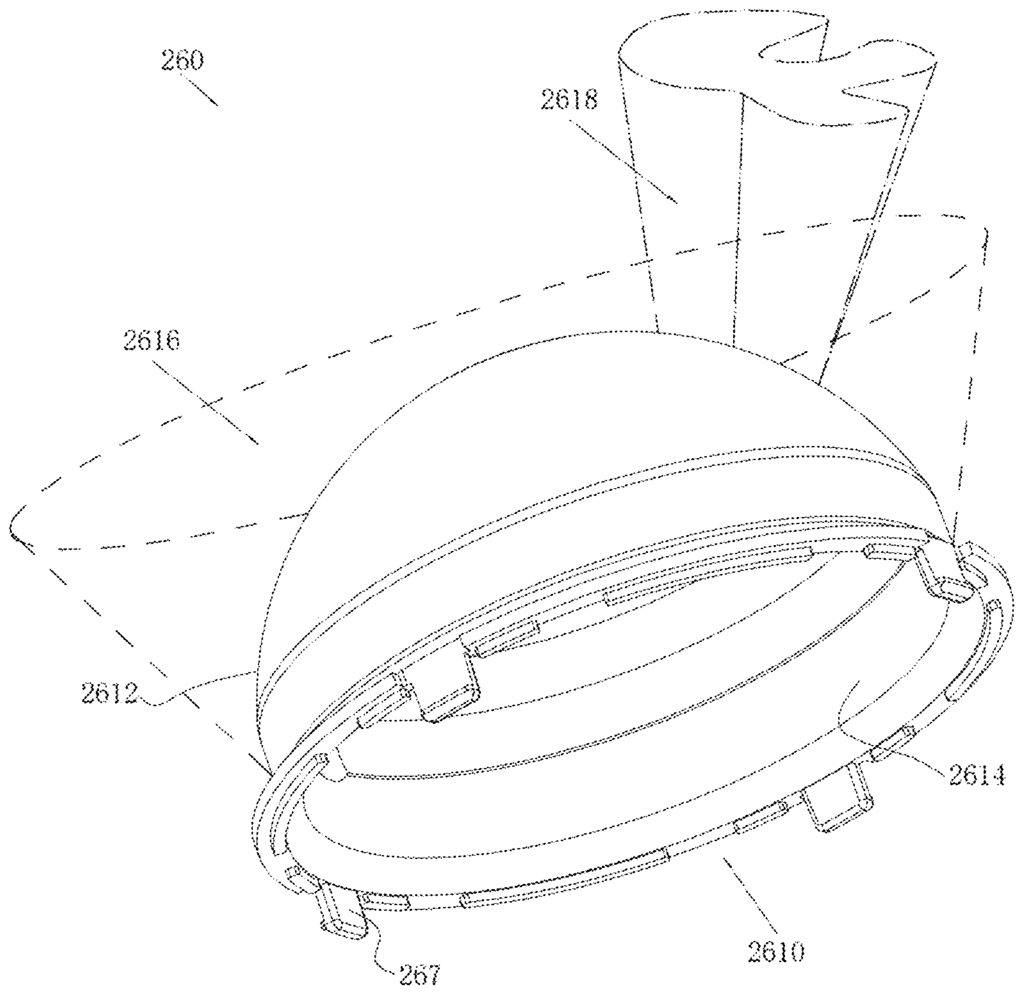
FIG. 1 is a schematic perspective view of a nebula lens.

In the figures: Incoherent light source (130); Radiator (132); Coherent light source assembly (140); First coherent light source (1401); Second coherent light source (1402); Auxiliary lens (230); Lens surface (232); Convex surface (234); Auxiliary pattern (235); Reflecting member (240); Rotation axis conversion member (245); Differential member (246); Nebula lens (260); Main structure (2601); Optical element mounting hole (2602); Optical element mounting surface (2603); Optical element positioning part (2604); Opening (2610); Outer surface (2612); Inner surface (2614); Light-emitting area (2616); Variation area (2618); Nebula pattern (265); Strip-shaped bending lines (2651); Strip-shaped vertical line (2652); Joint part (267); Variation part (269); Varying line (2691); Diffractive optical element (270); Optical element mounting part (271); Lens base (280); Electronic control unit (300); Incoherent light control unit (310); Coherent light master control (315); First coherent light control unit (320); Second coherent light control unit (330); Drive control unit (405); Driving member (410); First driving member (4101); Second driving member (4102); Output end (412); Mating part (420); Power supply unit (450); Upper shell (500); Night light lamp cover (505); Positioning mounting ring (510); Positioning mounting part (5102); Bracket mounting body (515); Base support part (5156); Lower shell (520); Control button (522); Indicator lamp (523); Wireless module (525); Base (540); Heat dissipation hole (545).

DESCRIPTION OF EMBODIMENTS

In describing the preferred embodiments, specific terminology will be resorted to for the sake of clarity. It is to be understood that each specific term includes all technical equivalents which operate in a similar manner to accomplish a similar purpose.

While various aspects and features of certain embodiments have been summarized above, the following detailed description illustrates a few exemplary embodiments in further detail to enable one skilled in the art to practice such embodiments. Reference will now be made in detail to embodiments of the inventive concept, examples of which are illustrated in the accompanying drawings. The accompanying drawings are not necessarily drawn to scale. The described examples are provided for illustrative purposes and are not intended to limit the scope of the invention. It should be understood, however, that persons having ordinary skill in the art may practice the inventive concept without these specific details.

It will be understood that, although the terms first, second, etc. may be used herein to describe various elements, these elements should not be limited by these terms. These terms are only used to distinguish one element from another. For example, a first attachment could be termed a second attachment, and, similarly, a second attachment could be termed a first attachment, without departing from the scope of the inventive concept.

It will be understood that when an element or layer is referred to as being "on," "coupled to," or "connected to" another element or layer, it can be directly on, directly coupled to or directly connected to the other element or layer, or intervening elements or layers may be present. In contrast, when an element is referred to as being "directly on," "directly coupled to," or "directly connected to" another element or layer, there are no intervening elements or layers present. Like numbers refer to like elements throughout. As used herein, the term "and/or" includes any and all combinations of one or more of the associated listed items.

As used in the description of the inventive concept and the appended claims, the singular forms "a," "an," and "the" are intended to include the plural forms as well, unless the context clearly indicates other.

Figure 2:
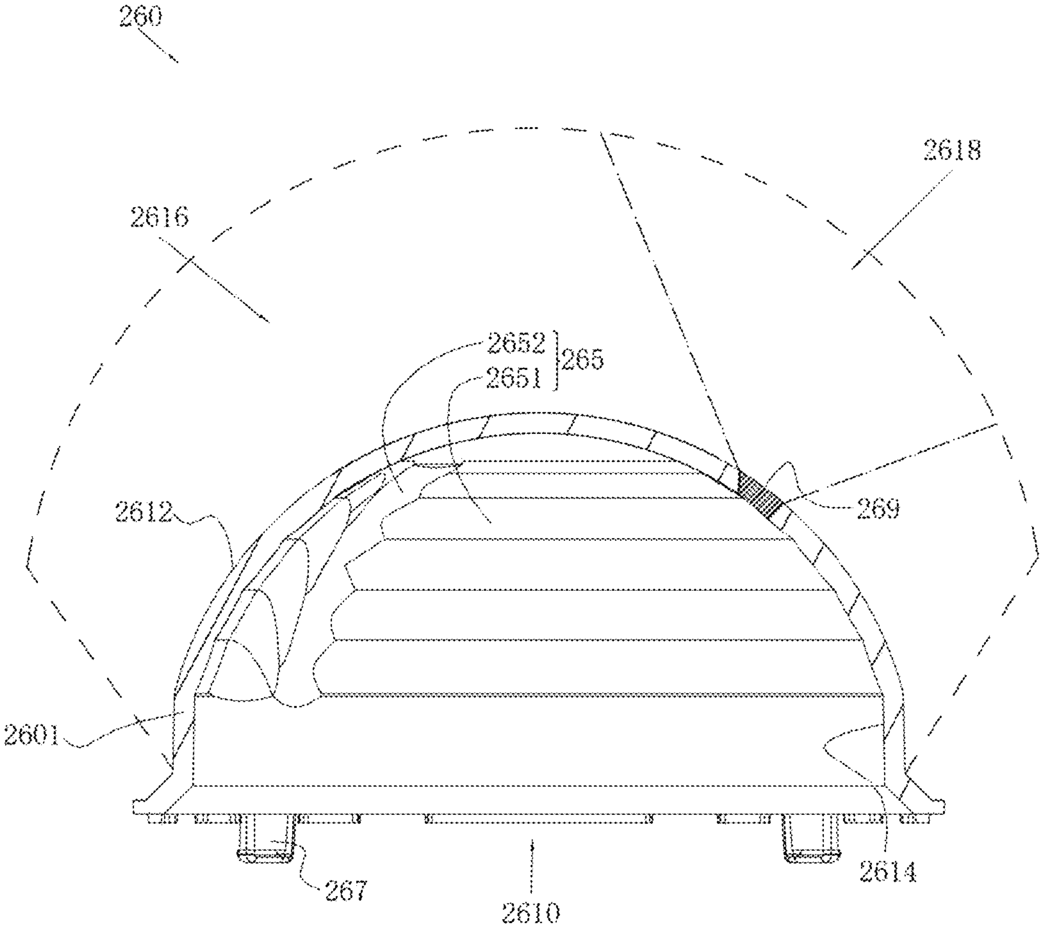
FIG. 2 is a sectional view of the nebula lens as viewed from the front.

As shown in FIGS. 1 and 2, the present invention provides a nebula lens 260, which comprises at least one main structure 2601 and at least one opening 2610 arranged on the main structure 2601. The main structure 2601 has at least one outer surface 2612 and at least one inner surface 2614.

The main structure 2601 has a tendency to protrude away from the opening 2610. The inner surface 2614 defines at least one cavity, and the outer surface 2612 defines at least one light-emitting area 2616, which faces away from the opening 2610 and extends outward from the outer surface 2612.

The main structure 2601 is provided with at least one layer of nebula pattern 265 and at least one variation part 269, and the variation part 269 defines at least one variation area 2618, which faces away from the opening 2610 and extends outward from the outer surface 2612.

In this embodiment, the main structure 2601 is a rotating body, specifically a thin-walled structure with a partial spherical shape, but it is not limited thereto. In another embodiment, the main structure 2601 is a rotating body with other shapes, such as an ellipsoid, a frustum, etc.

When a beam of incoherent light is irradiated from the inner surface 2614 to the outer surface 2612 of the nebula lens 260, under the action of the structure of the lens itself and the nebula pattern 265, the nebula pattern 265 is an undulating structure, and the incoherent light will change and be emitted to the light-emitting area 2616. When this changed incoherent light is projected from the light-emitting area 2616 to the surface of the projected object, an image is generated, which is close to the image of a huge cloud composed of gas and dust in the universe, therefore it is named nebula.

In this embodiment, the nebula pattern 265 is arranged on the inner surface 2614 of the main structure 2601, and the outer surface 2612 is smooth. In another embodiment, the nebula pattern 265 is arranged on the outer surface 2612 of the main structure 2601, and the inner surface 2614 is smooth.

In this embodiment, the main structure 2601 is also provided with four joint parts 267. The joint parts 267 are used to connect other components or structures, and the nebula lens 260 is used in combination with other components, but it is not limited thereto. In other embodiments, the main structure 2601 itself can be used in combination with other components, and thus it is unnecessary to provide the joint parts 267.

As shown in FIGS. 1 and 2, the variation part 269 includes a variation member arranged on the main structure 2601, which has a light transmittance different from that of the main structure 2601. Incoherent light is projected out after passing through the variation member on the variation part 269, so the variation area 2618 forms a change different from the light-emitting area 2616 due to the different light transmittance. In another embodiment, the variation member can block light in part of the wavelength range, so that the light passing through the variant is close to a single color, so that the color of the generated image in the variation area 2618 is different from that of the light-emitting area 2616, so that the finally seen nebula image has some special changes, but it is not limited thereto. In other embodiments, the variant can be customized to meet the different needs of users, so that the variant has different shapes, such as heart-shaped, diamond-shaped, special symbols, etc., and with the background of the nebula, it can bring users an impressive and unique feeling.

Since the variation part 269 is in the light-emitting area 2616 at this time, the variation area 2618 covers the light-emitting area 2616, and the changes generated by the variation area 2618 are superimposed in the light-emitting area 2616, but it is not limited thereto. In another embodiment, the variation part 269 is annular, and the outer surface 2612 of the light-emitting area 2616 is surrounded by the variation part 269, so that the variation area 2618 covers the light-emitting area 2616 at this time.

Figure 3:
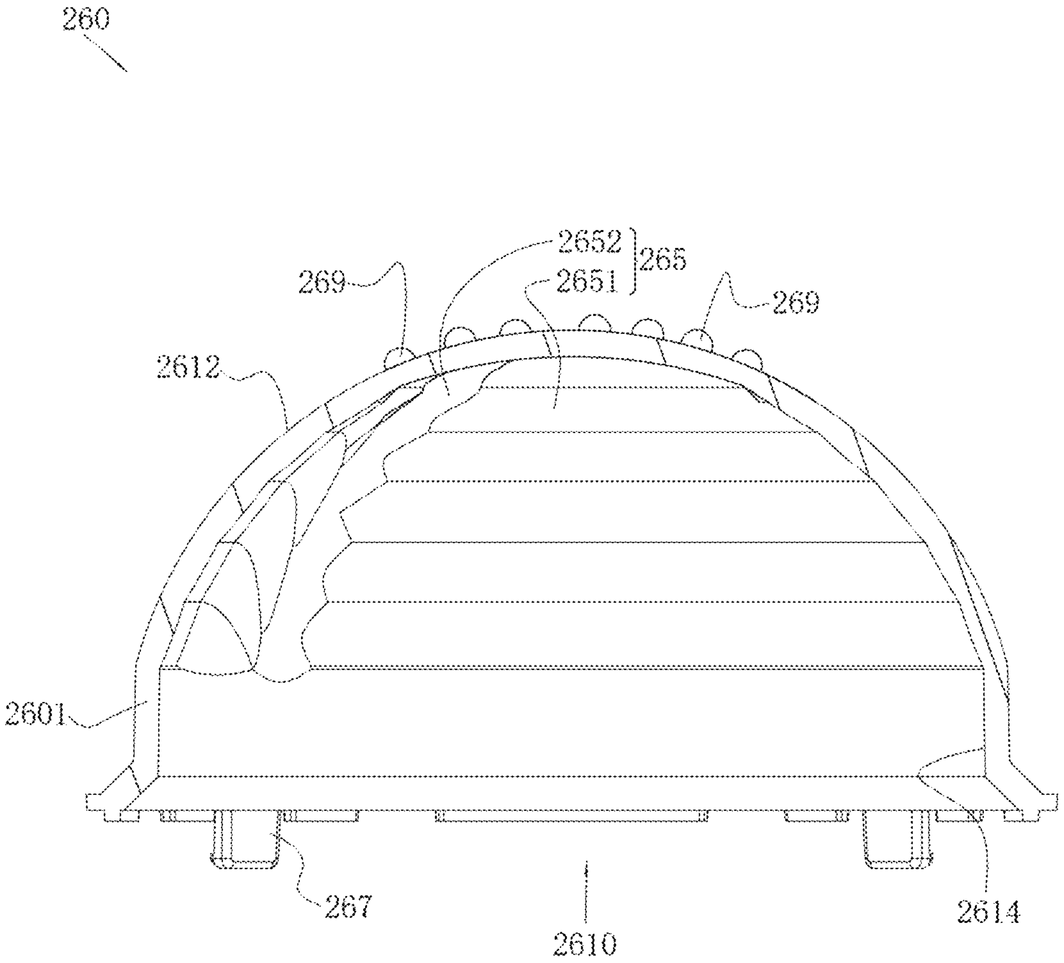
FIG. 3 is a sectional view of a second embodiment of a nebula lens.

As shown in FIG. 3, this is the second embodiment of the nebula lens 260. The variation part 269 is a number of small convex lens structures arranged on the main structure 2601. The variation part 269 is provided with nebula pattern 265, and the convex lenses have the function of condensing light. Therefore, the brightness of the image formed in the variation area 2618 after the light passes through the variation part 269 is higher than that in the light-emitting area 2616, so that the generated nebula has different light and dark changes, which is more in line with the real starry sky law.

In another embodiment, because the variation part 269 has a curvature different from that of the main structure 2601, for example, a flat plane structure is adopted, and the variation part 269 is not provided with nebula pattern 265, so that the variation area 2618 changes differently from the light-emitting area 2616, and the purpose of changing the nebula is also achieved.

In another embodiment, the variation part 269 adopts a flat plane structure, and an optical element, such as a grating plate, is fixed on it to produce more changes on the nebula.

Figure 4:
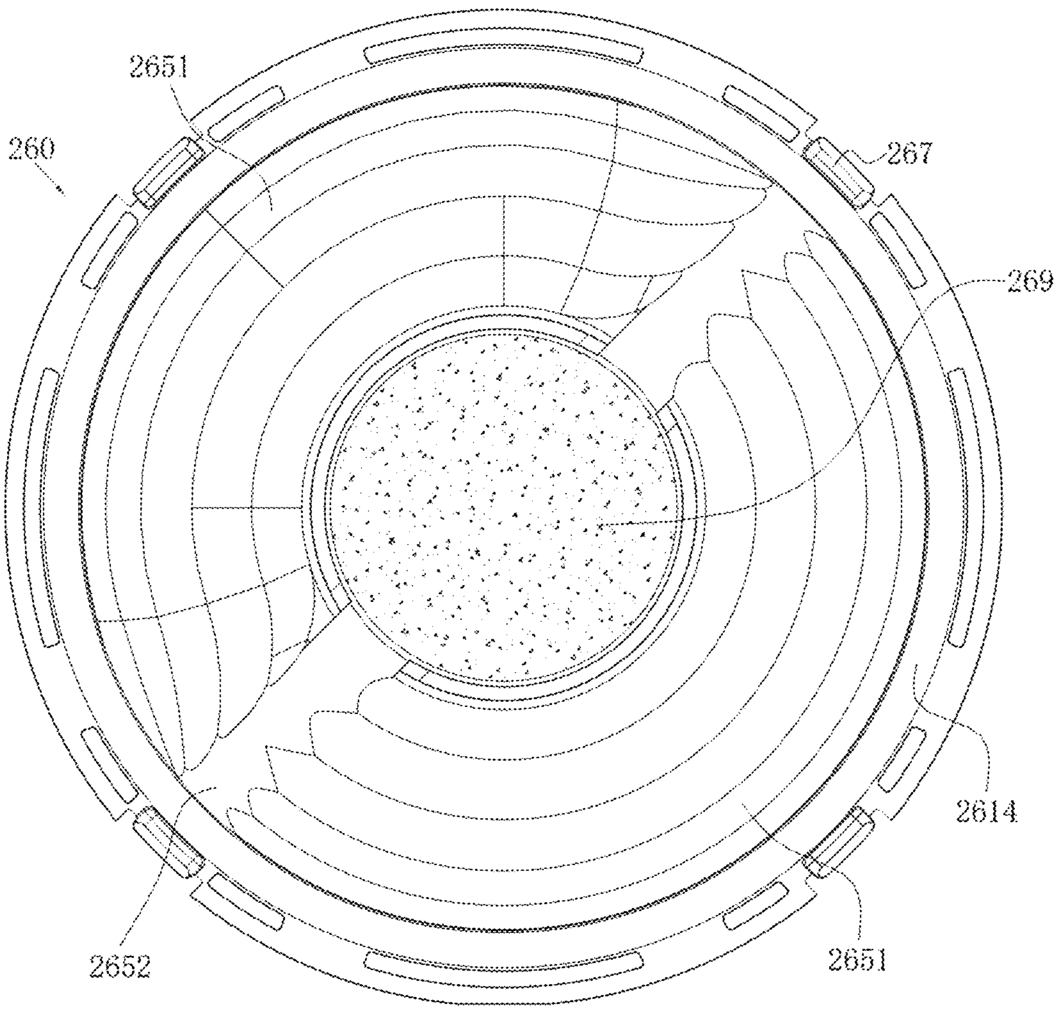
FIG. 4 is a schematic view from the bottom of a third embodiment of a nebula lens.

As shown in FIG. 4, this is the third embodiment of the nebula lens 260. The variation part 269 is formed by covering the inner surface 2614 with a layer of circular changing material, which has a shading effect, and there is no nebula pattern 265 in the area of the variation part 269. At this time, the variation area 2618 can produce a circular image with low brightness, and a feeling similar to a black hole is generated under the nebula background. In other embodiments, the variation part 269 can be in other shapes, set in other positions, and have other light transmission effects.

In another embodiment, the changing material can be arranged on the outer surface 2612, and in another embodiment, the variation part 269 is provided with a nebula pattern 265, and the changing material covers the nebula pattern 265 of the variation part 269, which has the advantage that the structure of the nebula pattern 265 of the variation part 269 does not need to be cancelled separately.

As shown in FIG. 4, in this embodiment, the nebula pattern 265 include ten strip-shaped bending lines 2651 and two strip-shaped vertical lines 2652. The ten strip-shaped bending lines 2651 are concentrically arranged and have similar slender curved stripe-shaped appearance, and the number of the strip-shaped vertical lines 2652 is two. In the process of approaching the top of the nebula lens 260, the radial size of the strip-shaped bending lines 2651 gradually decreases. However, it is not limited thereto. In other embodiments, there may be several strip-shaped bending lines 2651 and strip-shaped vertical lines 2652 that can produce a display effect, or they can be irregular and unrelated shapes and arrangements that meet the requirements of the display effect.

Figure 5:
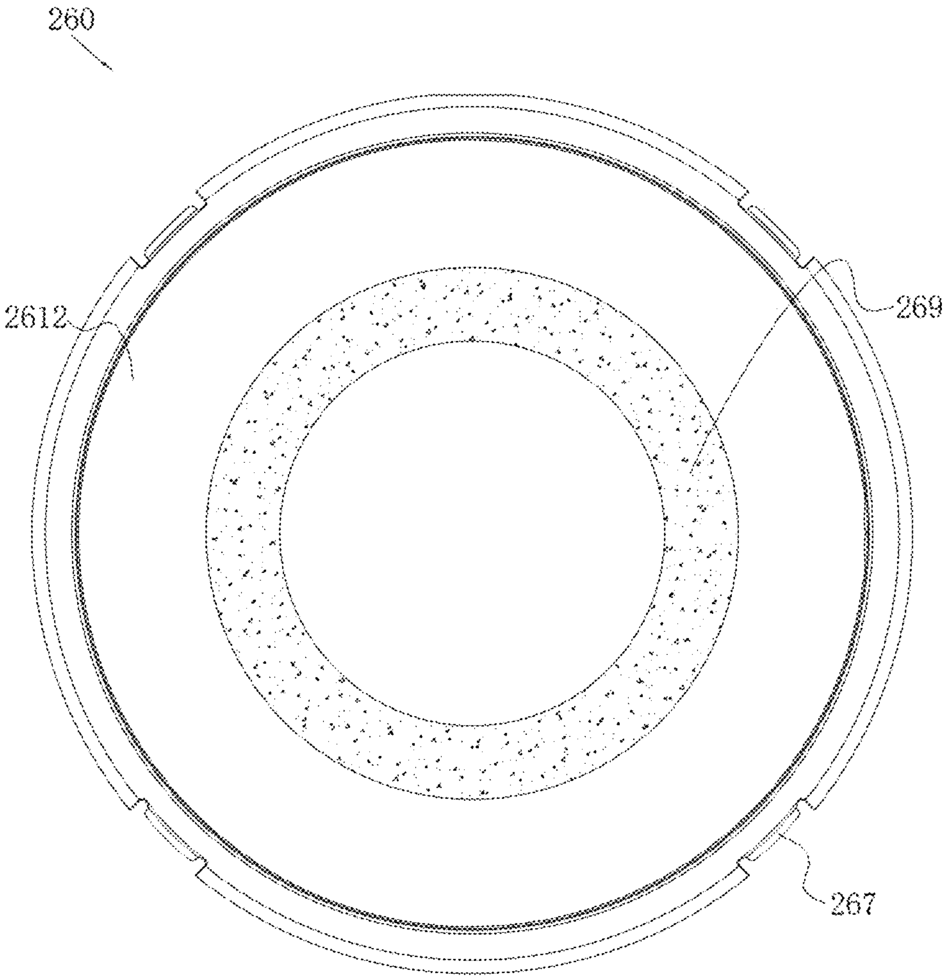
FIG. 5 is a schematic view of a fourth embodiment of a nebula lens viewed from the top.

As shown in FIG. 5, this is the fourth embodiment of the nebula lens 260. The variation part 269 has an annular appearance. By processing the production mold, the area where the variation part 269 is generated becomes rough, and then the light transmittance of the variation part 269 of the produced nebula lens 260 is changed.

Figure 6:
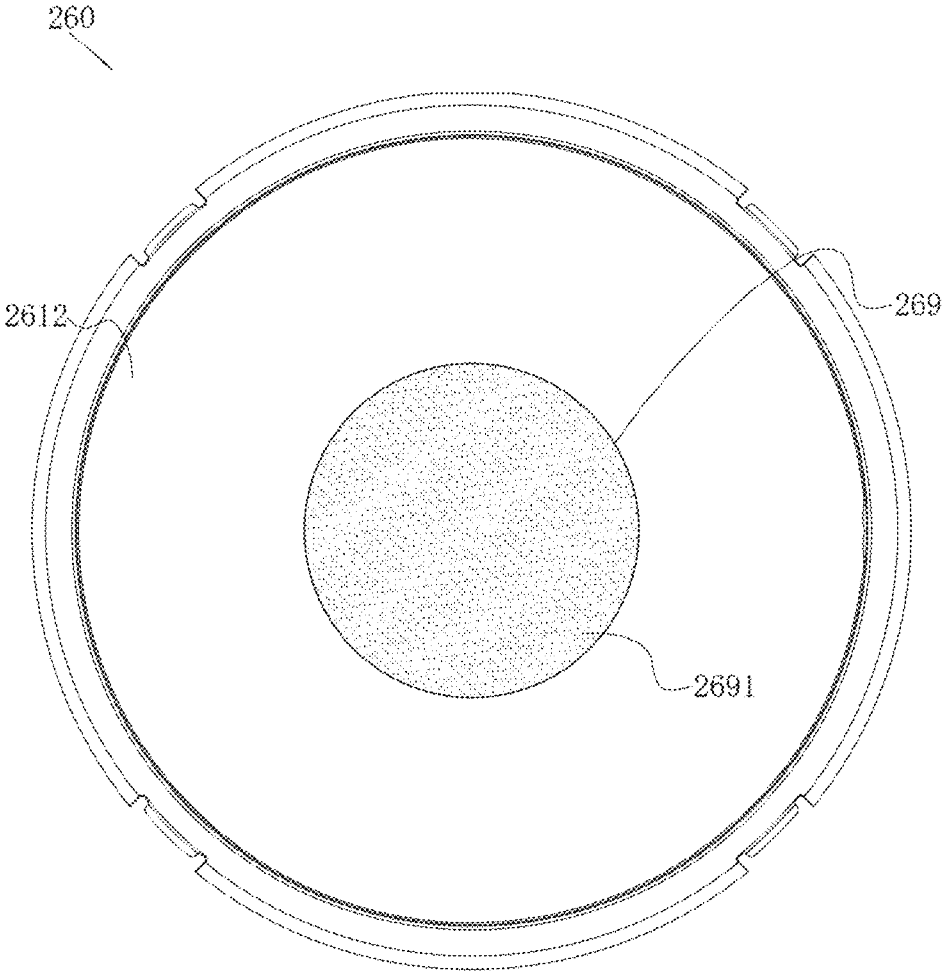
FIG. 6 is a schematic view from the top of a fifth embodiment of a nebula lens.
Figure 7:
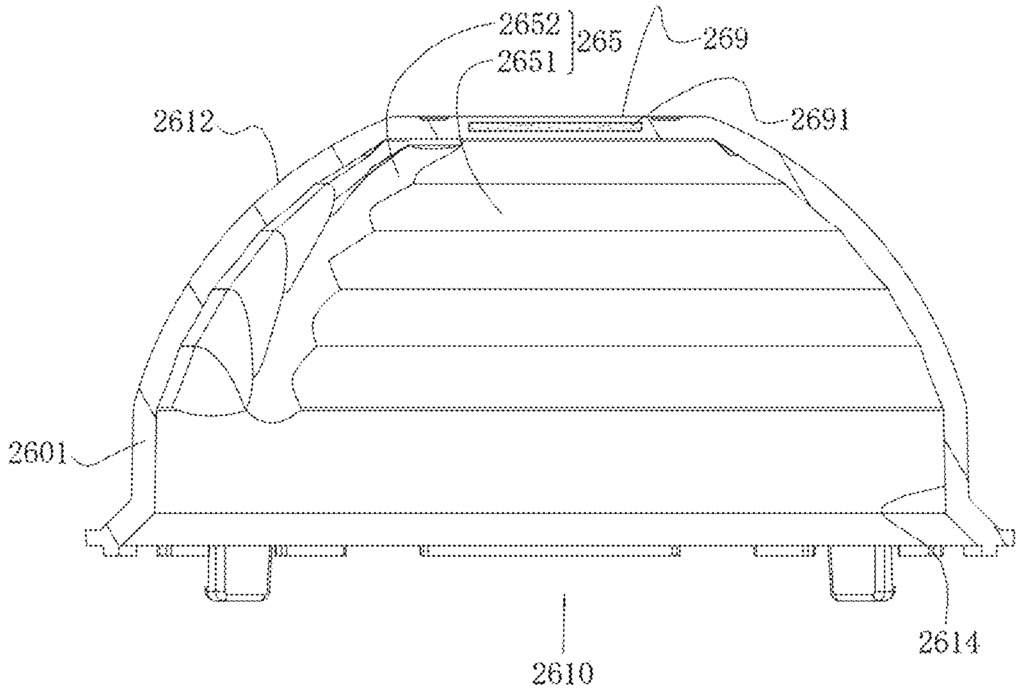
FIG. 7 is a cross-sectional view of the fifth embodiment of the nebula lens as viewed from the front.

As shown in FIG. 6 and FIG. 7, this is the fifth embodiment of the nebula lens 260. The variation part 269 is circular and is provided with a layer of varying lines 2691, which are arranged inside the variation part 269 by laser engraving. The advantage of being arranged inside is that the varying lines 2691 are not easy to be damaged and polluted, and the varying lines 2691 can change the light transmittance of the variation part 269 and change the nebula.

Figure 8:
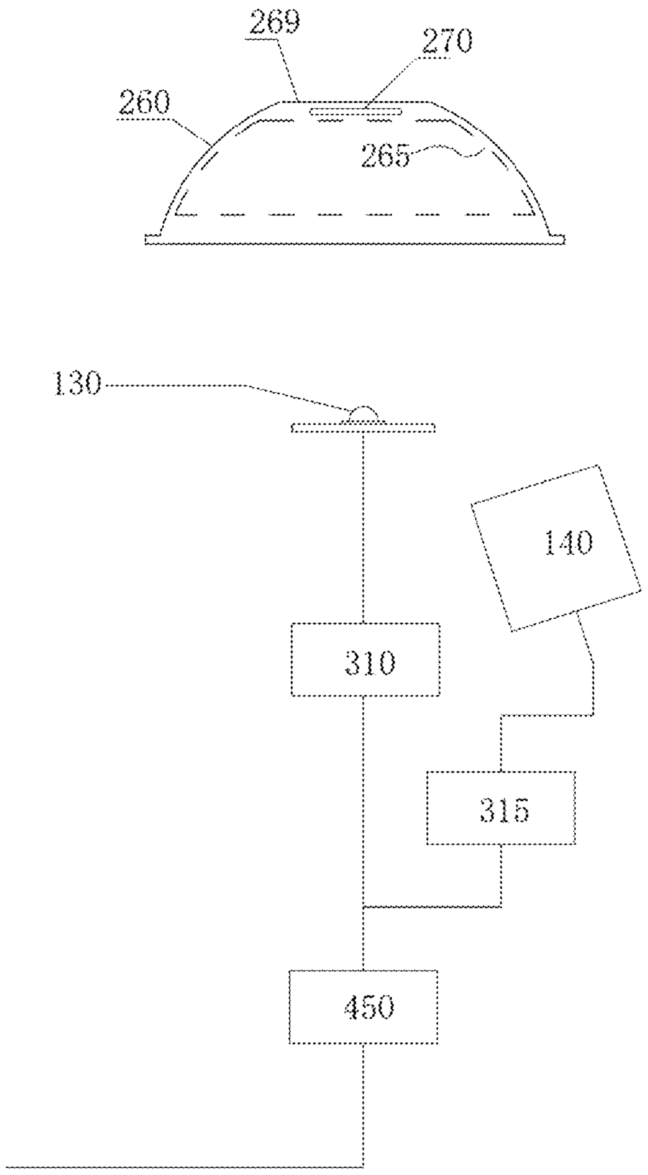
FIG. 8 is a schematic diagram of the first embodiment of the projection device.

As shown in FIG. 8, the present invention provides a starry sky projection device with a nebula lens 260, which is the first embodiment of the starry sky projection device, which is provided with a nebula lens 260 with a nebula pattern 265, an incoherent light source 130, and an incoherent light control unit 310, and a nebula lens 260 the top of which provided with a variation part 269, a coherent light source assembly 140, a coherent light master control 315, and a diffractive optical element 270.

In this embodiment, the variation part 269 is a flat structure, which is different from the curvature of the main structure 2601, and is arranged at the top central area of the nebula lens 260. The diffractive optical element 270 is arranged on the nebula lens 260, specifically in the variation part 269. This has the advantage that the variation part 269 is located in the middle area of the nebula lens 260, which facilitates the arrangement of coherent light sources and facilitates the production and assembly. However, it is not limited thereto. In other embodiments, the variation part 269 may be arranged in an off-center area, and the diffractive optical element 270 may be arranged at positions other than the variation part 269 on the main structure 2601.

In this embodiment, the incoherent light source 130 is an LED light source, which generates incoherent light, but it is not limited thereto, and the incoherent light source 130 can also be other light sources that can generate incoherent light.

Coherent light source assembly 140 is a coherent light source. Coherent light master control 315 can control the coherent light source assembly 140. Coherent light source assembly 140 can generate coherent light emitted to diffractive optical element 270. After the coherent light passes through diffractive optical element 270, it forms several light spots, which generates an effect similar to that of stars in the universe under the background of nebulae.

In addition, in order to control and supply power to the projection device, it also includes an incoherent light control unit 310 and a power supply unit 450. The incoherent light control unit 310 can control the incoherent light source 130 to change the coherent light it emits, including but not limited to controlling the color, intensity and frequency of color change of light. The power supply unit 450 supplies energy for the incoherent light control unit 310 and the incoherent light source 130. The power supply unit 450 can be a battery, an energy storage device, a power supply interface, an AC/DC conversion unit, etc.

In other embodiments, the incoherent light control unit 310 and the incoherent light source 130 can also be combined without being set up separately.

Figure 9:
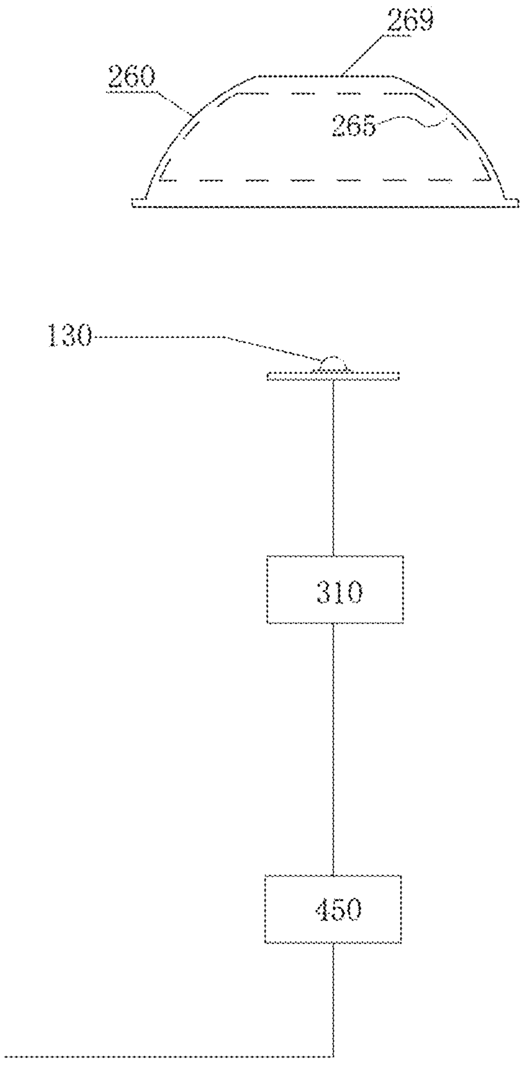
FIG. 9 is a schematic diagram of the second embodiment of the projection device.

As shown in FIG. 9, this is the second embodiment of the starry sky projection device, which includes a nebula lens 260 with a nebula pattern 265 and a variation part 269, an incoherent light source 130, an incoherent light control unit 310 and a power supply unit 450. In this embodiment, the coherent light source assembly 140 and the coherent light master control 315 are eliminated. Only the minimum parts for generating the nebula with variation are reserved, therefore it can reduce the cost and improve the production efficiency.

Figure 10:
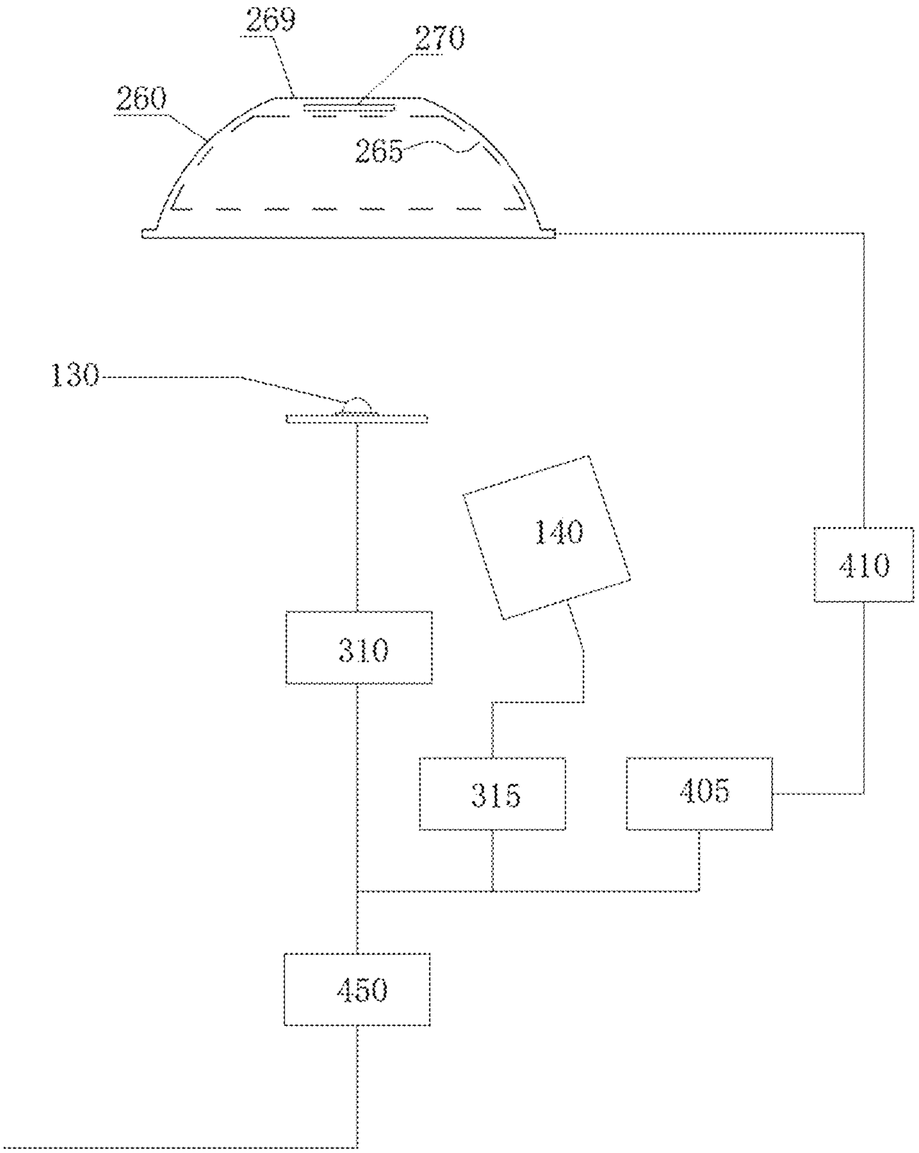
FIG. 10 is a schematic diagram of the third embodiment of the projection device.

As shown in FIG. 10, this is the third embodiment of the starry sky projection device, which includes a nebula lens 260 with a nebula pattern 265 and a variation part 269, an incoherent light source 130, a diffractive optical element 270 arranged on the nebula lens 260, a coherent light source assembly 140 and a coherent light master control 315, and a driving module, which includes a driving member 410 and a drive control unit 405. The coherent light source assembly 140 is a coherent light source and can generate coherent light.

The driving member 410 can drive the nebula lens 260 to rotate around a rotation axis, and the drive control unit 405 can control the driving member 410, including but not limited to the rotation direction and speed.

The variation part 269 is circular and has a certain shading effect, so it can produce an image similar to a black hole in the nebula.

Due to the rotation of the nebula lens 260, the incoherent light source 130 remains fixed, and incoherent light irradiates the rotating nebula lens 260, so that the generated nebula also rotates. Because the diffractive optical element 270 is arranged on the nebula lens 260, the diffractive optical element 270 rotates in association with the nebula lens 260, and the coherent light generated by the fixed coherent light source assembly 140 irradiates the diffractive optical element 270, and stars associated with the rotating nebula are generated, which generates a moving starry sky that simulates the movement of stars and nebulae around the Great Attractor in the real starry sky. Compared with the prior art, the projection effect of this moving starry sky can meet the user's visual needs to a greater extent.

Figure 11:
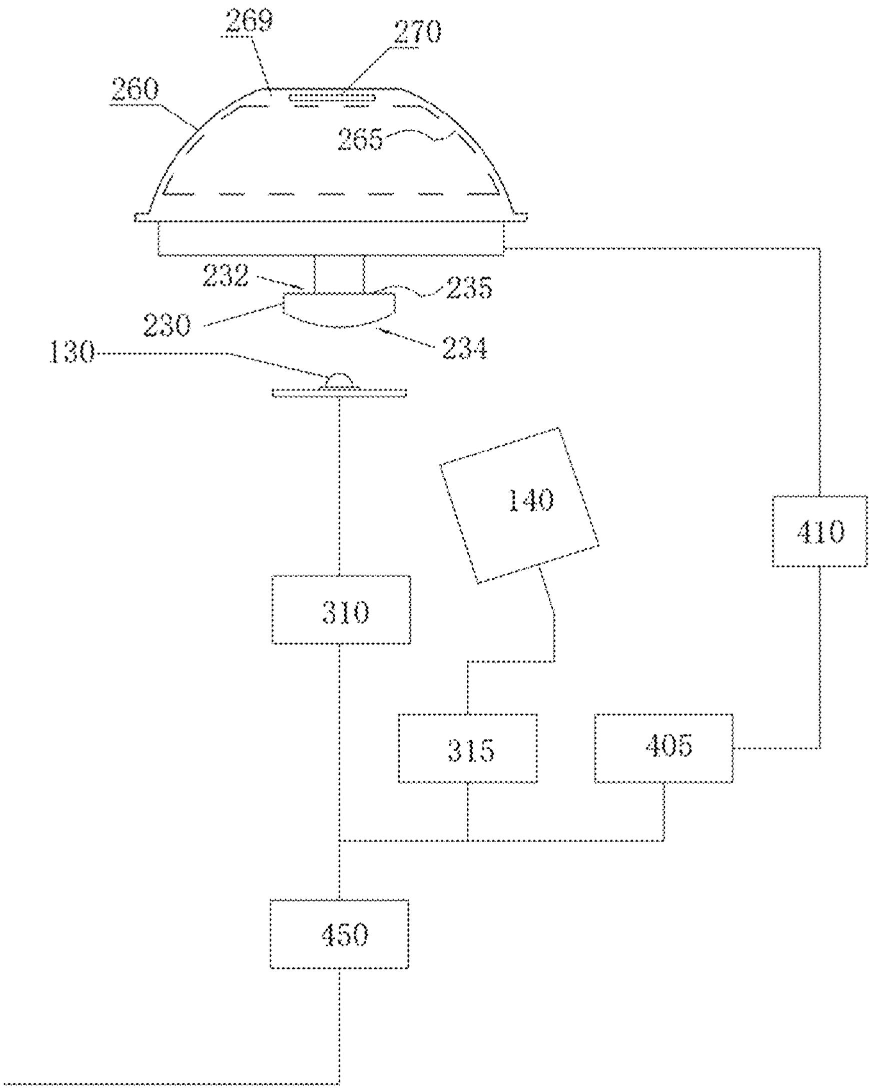
FIG. 11 is a schematic diagram of the fourth embodiment of the projection device.

As shown in FIG. 11, this is the fourth embodiment of the starry sky projection device, which includes a nebula lens 260 with a nebula pattern 265 and a variation part 269, an incoherent light source 130, a diffractive optical element 270 arranged on the nebula lens 260, a coherent light source assembly 140 and a coherent light master control 315, and a driving module, which includes a driving member 410 and a drive control unit 405, and an auxiliary lens 230. The coherent light source assembly 140 is a coherent light source and can generate coherent light.

The auxiliary lens 230 is provided with at least one convex surface 234, which tends to protrude away from the center. The auxiliary lens 230 is provided with at least one layer of an auxiliary pattern 235 with irregular shapes and protrusions of different sizes.

In this embodiment, the auxiliary lens 230 is arranged between the incoherent light source 130 and the nebula lens 260. The incoherent light generated by the incoherent light source 130 first passes through the auxiliary lens 230 and then passes through the nebula lens 260. Under the action of the lens structure of the auxiliary lens 230 and the auxiliary pattern 235, the incoherent light undergoes an optical change and then passes through the nebula lens 260 with the nebula pattern 265. Under the action of the structure of the nebula lens 260 and the nebula pattern 265, the optical change is generated again, and in addition, an image change generated by the incoherent light in the variation area 2618 of the variation part 269, at this time, a new nebula can be formed when the coherent light is irradiated on the projected object, and such nebula has the characteristics of rich colors and cloud shape.

At the same time, because the auxiliary lens 230 is fixedly connected with the nebula lens 260, when the nebula lens 260 rotates, the auxiliary lens 230 will also rotate. Due to the existence of the nebula pattern 265, the light emitted by the incoherent light source 130 will have different dynamic changes. When the auxiliary lens 230 rotates, the light emitted by the incoherent light source 130 will have different dynamic changes again due to the existence of the auxiliary pattern 235. Therefore, the nebula in this embodiment has dual rotation dynamics, and the projected nebula has rich dynamic effects.

In this embodiment, the lens surface 232 is a flat surface, and auxiliary pattern 235 are provided on the lens surface 232. The convex surface 234 is convex in the direction away from the lens surface 232, and the surface is smooth without patterns. The lens surface 232 is arranged above the convex surface 234, but it is not limited thereto. In other embodiments, the auxiliary lens 230 can also be provided with auxiliary pattern 235 on the convex surface.

Similarly, in another embodiment, the auxiliary lens 230 has two convex surfaces, and the auxiliary pattern 235 can be arranged on either convex surface.

Similarly, in another embodiment, the plane of the auxiliary lens 230 is below and the convex surface is above, and the auxiliary pattern 235 can be arranged only on the convex surface or only on the plane.

In other embodiments, the auxiliary lens 230 can also generate the auxiliary pattern 235 inside the auxiliary lens 230 by laser engraving.

Figure 12:
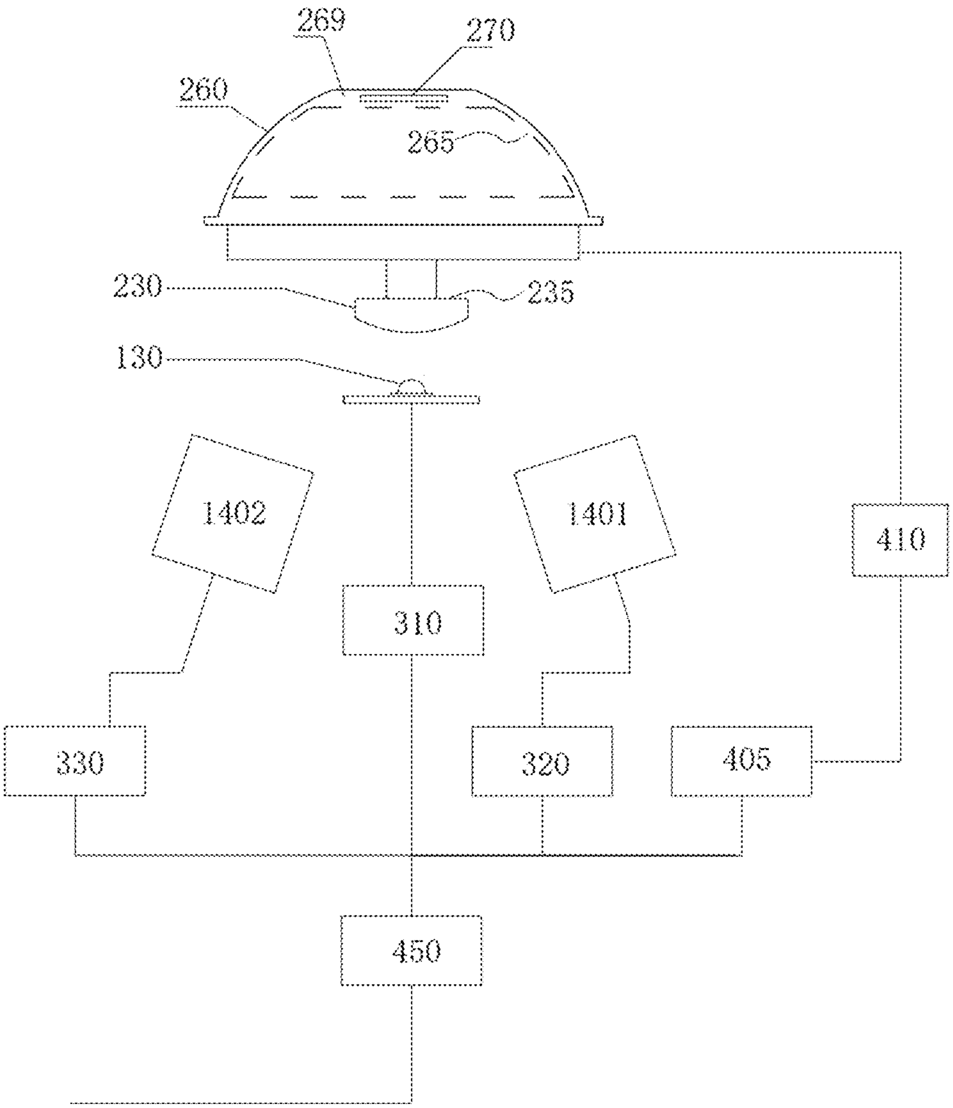
FIG. 12 is a schematic diagram of the fifth embodiment of the projection device.

As shown in FIG. 12, this is the fifth embodiment of the starry sky projection device, which includes a nebula lens 260 with a nebula pattern 265 and a variation part 269, an incoherent light source 130, a diffractive optical element 270 arranged on the nebula lens 260, and a driving module, which includes a driving member 410 and a drive control unit 405, an auxiliary lens 230, a first coherent light control unit 320 and a first coherent light source 1401, and a second coherent light control unit 330 and a second coherent light source 1402.

The first coherent light source 1401 and the second coherent light source 1402 are both coherent light sources, and both of them can generate coherent light, which irradiates the diffractive optical element 270 to generate more stars and enhance the experience.

Figure 13:
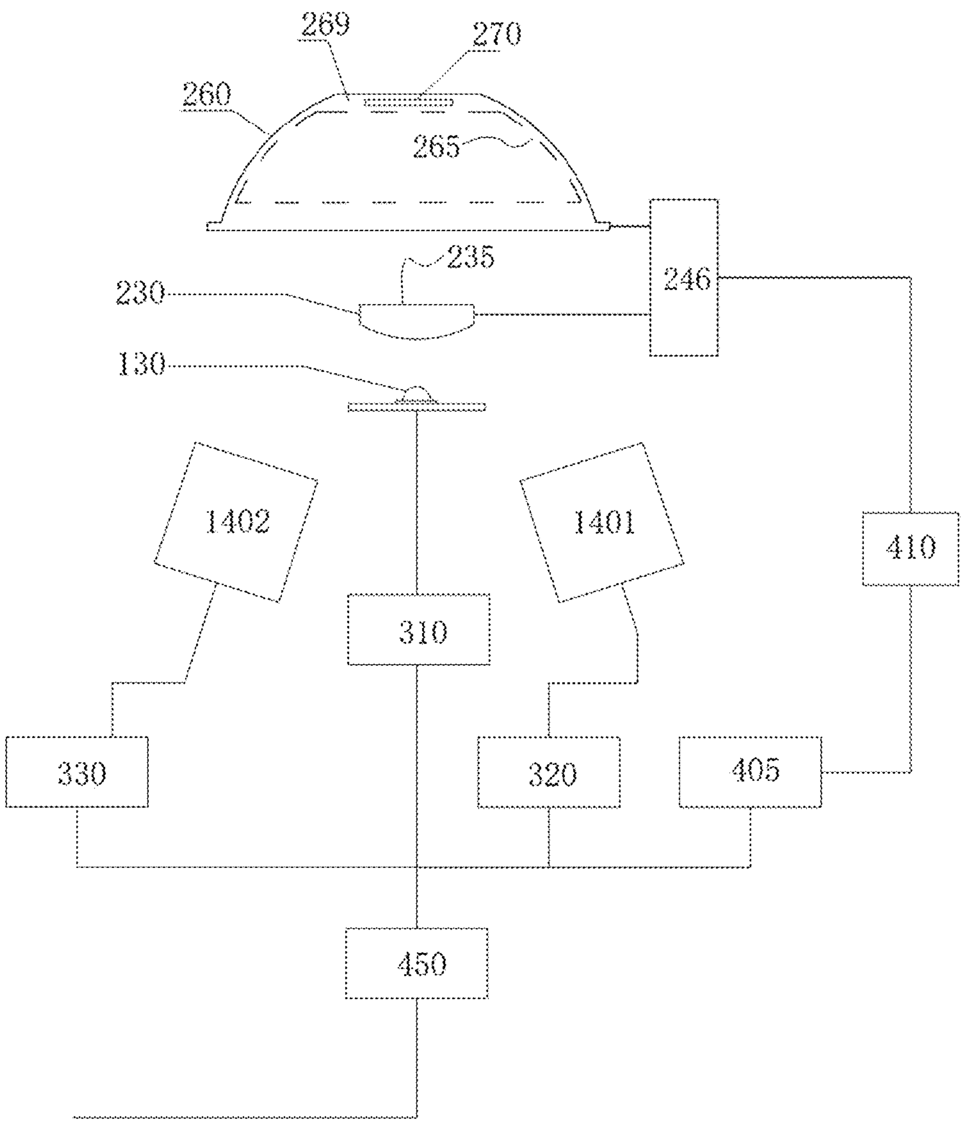
FIG. 13 is a schematic diagram of the sixth embodiment of the projection device.

As shown in FIG. 13, this is the sixth embodiment of the starry sky projection device, which includes a nebula lens 260 with a nebula pattern 265 and a variation part 269, an incoherent light source 130, an incoherent light control unit 310, a diffractive optical element 270 arranged on the nebula lens 260, and a driving module, which includes a driving member 410 and a drive control unit 405, an auxiliary lens 230, a first coherent light control unit 320 and a first coherent light source 1400, a second coherent light control unit 330, a second coherent light source 1402, and a differential member 246.

The first coherent light source 1401 and the second coherent light source 1402 are both coherent light sources. The first coherent light source 1401 and the second coherent light source 1402 irradiate the same diffractive optical element 270. The differential member 246 is connected to the nebula lens 260 and the auxiliary lens 230, respectively. The driving member 410 is connected to the differential member 246. The differential member 246 is used to make the nebula lens 260 and the auxiliary lens 230 rotate at different speeds. Compared with rotation at the same speed, the dynamic change effect is more obvious.

In another embodiment, the differential member 246 can also change the rotation mode, so that the nebula lens 260 and the auxiliary lens 230 can rotate at different speeds and in different directions.

Figure 14:
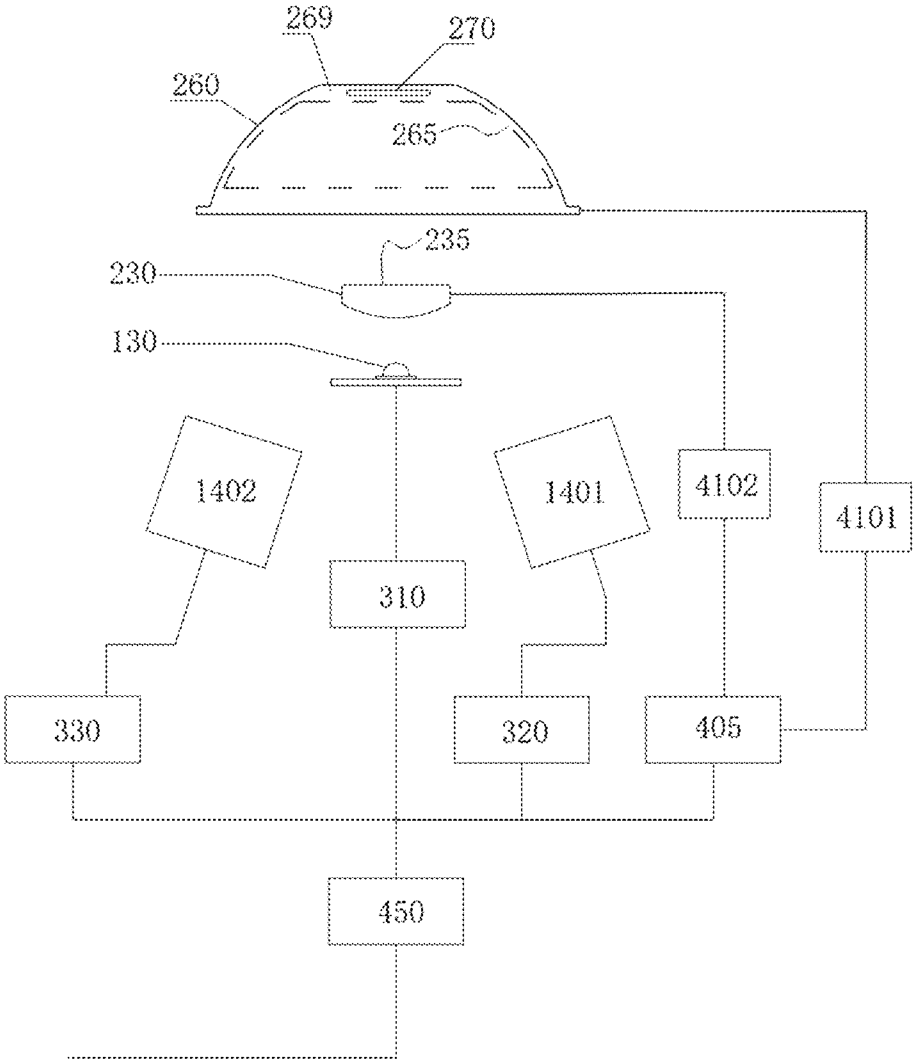
FIG. 14 is a schematic diagram of the seventh embodiment of the projection device.

As shown in FIG. 14, this is the seventh embodiment of the starry sky projection device, which includes a nebula lens 260 with a nebula pattern 265 and a variation part 269, an incoherent light source 130, an incoherent light control unit 310, a diffractive optical element 270 arranged on the nebula lens 260, and a driving module, which includes a first driving member 4101, a second driving member 4102 and a drive control unit 405, and an auxiliary lens 230 with an auxiliary pattern 235, a first coherent light control unit 320 and a first coherent light source 1401, a second coherent light control unit 330 and a second coherent light source 1402. The first coherent light source 1401 and the second coherent light source 1402 are coherent light sources and can generate coherent light.

The drive control unit 405 can control the first driving member 4101 and the second driving member 4102, including but not limited to the rotation direction and the rotation speed. The first driving member 4101 is connected with the nebula lens 260 and the second driving member 4102 is connected with the auxiliary lens 230, so that the nebula lens 260 and the auxiliary lens 230 can rotate at different speeds and in different directions.

Figure 15:
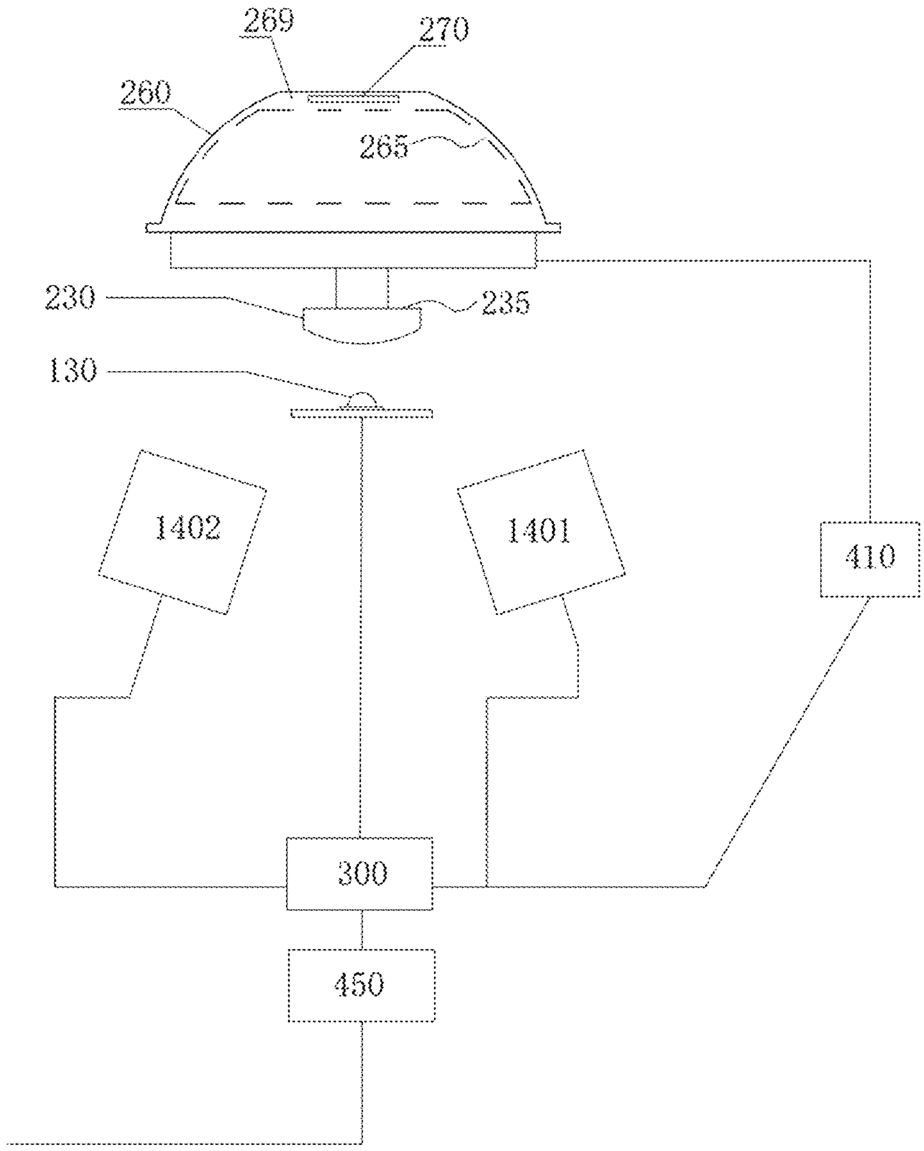
FIG. 15 is a schematic diagram of the eighth embodiment of the projection device.

As shown in FIG. 15, this is the eighth embodiment of the starry sky projection device, which includes a nebula lens 260 with a nebula pattern 265 and a variation part 269, an auxiliary lens 230 with an auxiliary pattern 235, a diffractive optical element 270 arranged on the nebula lens 260, an incoherent light source 130, a driving module including a driving member 410, a first coherent light source 1401 and a second coherent light source 1402, and an electronic control unit 300. The first coherent light source 1401 and the second coherent light source 1402 are coherent light sources and can generate coherent light.

By integrating the control of various electrical components into the electronic control unit 300, the electronic control unit 300 can control the first coherent light source 1401 and the second coherent light source 1402 the driving module to reduce the space occupation.

Figure 16:
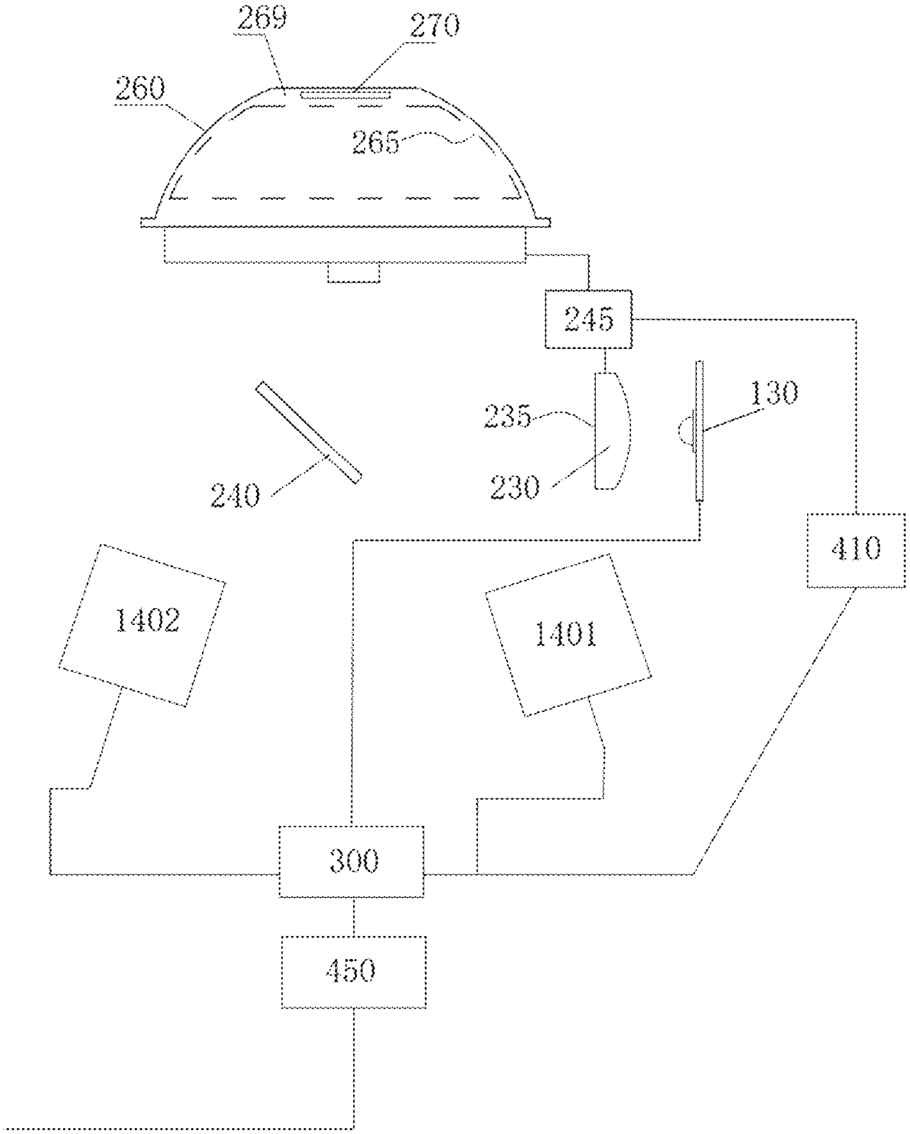
FIG. 16 is a schematic diagram of the ninth embodiment of the projection device.

As shown in FIG. 16, this is the ninth embodiment of the starry sky projection device, which includes a nebula lens 260 with a nebula pattern 265, an auxiliary lens 230 with an auxiliary pattern 235, an incoherent light source 130, a diffractive optical element 270, a first coherent light source 1401 and a second coherent light source 1402, both of which are coherent light sources, an electronic control unit 300, a power supply unit 450, a driving module including a driving member 410, a reflecting member 240 and a rotation axis conversion member 245.

The driving member 410 is connected with the rotation axis conversion member 245, and the rotation axis conversion member 245 is connected with the nebula lens 260 and the auxiliary lens 230, so that the nebula lens 260 and the auxiliary lens 230 can rotate around different rotation axes. The incoherent light source 130, the nebula lens 260 and the auxiliary lens 230 are all arranged at one side of the reflecting member 240. The light emitted by the incoherent light source 130 first passes through the auxiliary lens 230 and irradiates the reflecting member 240, and then passes through the nebula lens 260 after being reflected by the reflecting member 240. At this time, the optical path is in a number of broken lines.

Figure 17:
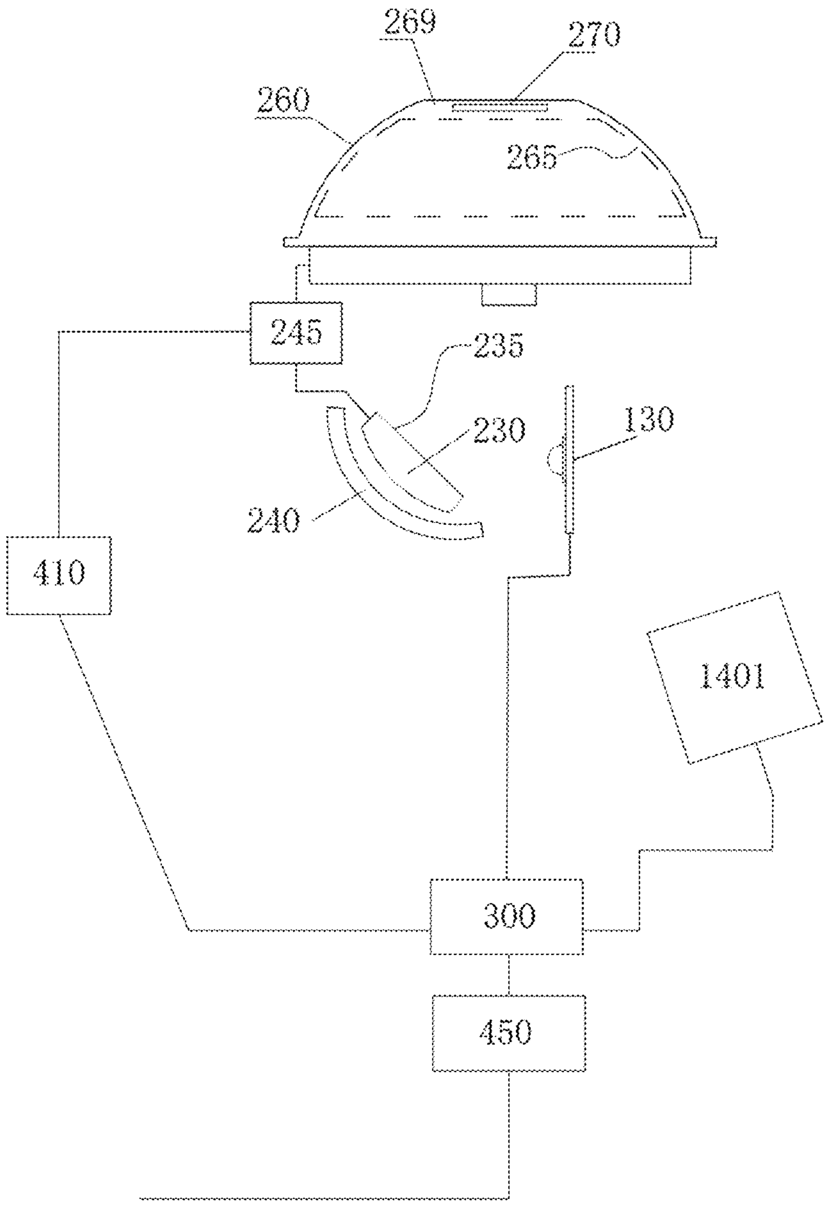
FIG. 17 is a schematic diagram of the tenth embodiment of the projection device.

As shown in FIG. 17, this is the tenth embodiment of the starry sky projection device, which includes a nebula lens 260 with a nebula pattern 265, an auxiliary lens 230 with an auxiliary pattern 235, an incoherent light source 130, a diffractive optical element 270, a first coherent light source 1401 and a second coherent light source 1402, both of which are coherent light sources, an electronic control unit 300, a power supply unit 450, a driving module including a driving member 410, a reflecting member 240 and a rotation axis conversion member 245.

The incoherent light source 130 and the nebula lens 260 are arranged on one side of the auxiliary lens 230, and the reflecting member 240 is arranged on the other side of the auxiliary lens 230. The light emitted by the incoherent light source 130 first passes through the auxiliary lens 230, shines on the reflecting member 240, is reflected by the reflecting member 240, then passes through the auxiliary lens 230, and finally passes through the nebula lens 260. At this time, the optical path presents several broken lines. In other embodiments, the reflecting member 240 can also use a layer of a reflective material instead to achieve similar effects.

In this embodiment, the reflecting member 240 is designed in an arc shape in order to better ensure the reflection effect.

Figure 18:
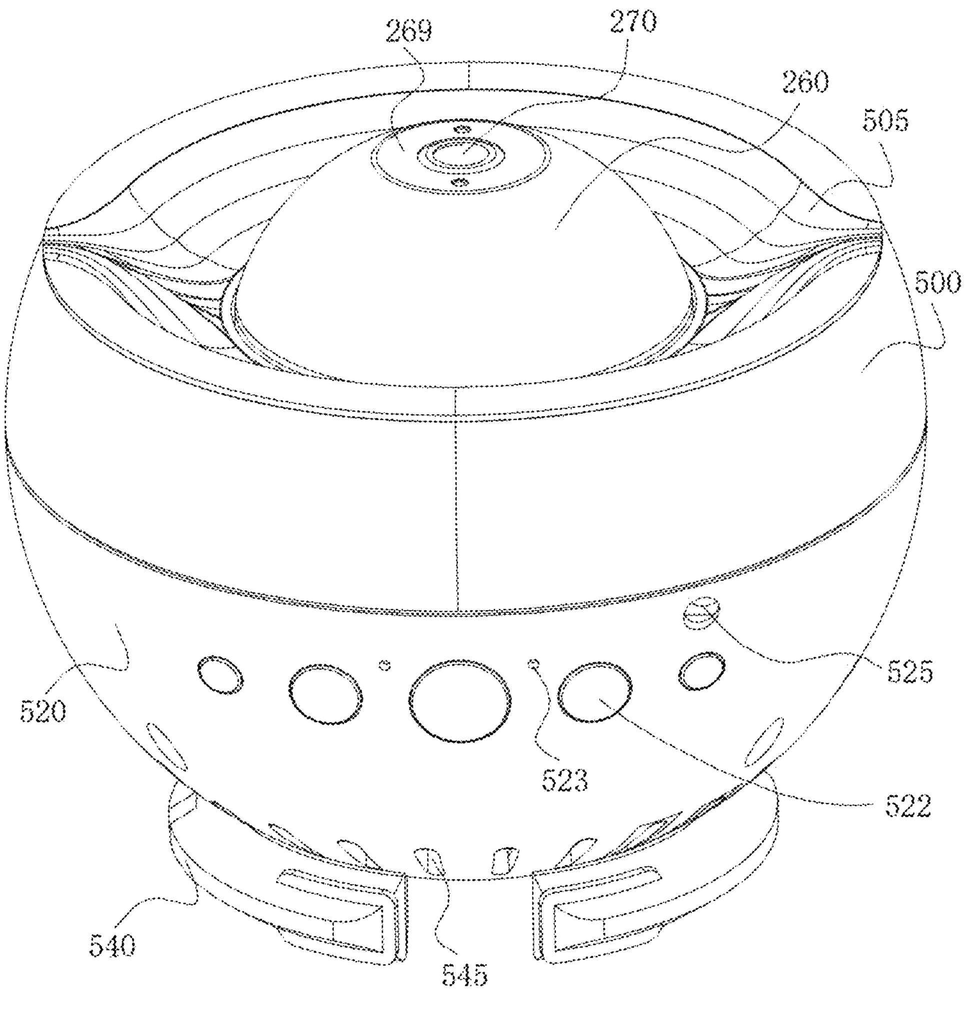
FIG. 18 is a perspective view of an eleventh embodiment of the projection device.
Figure 19:
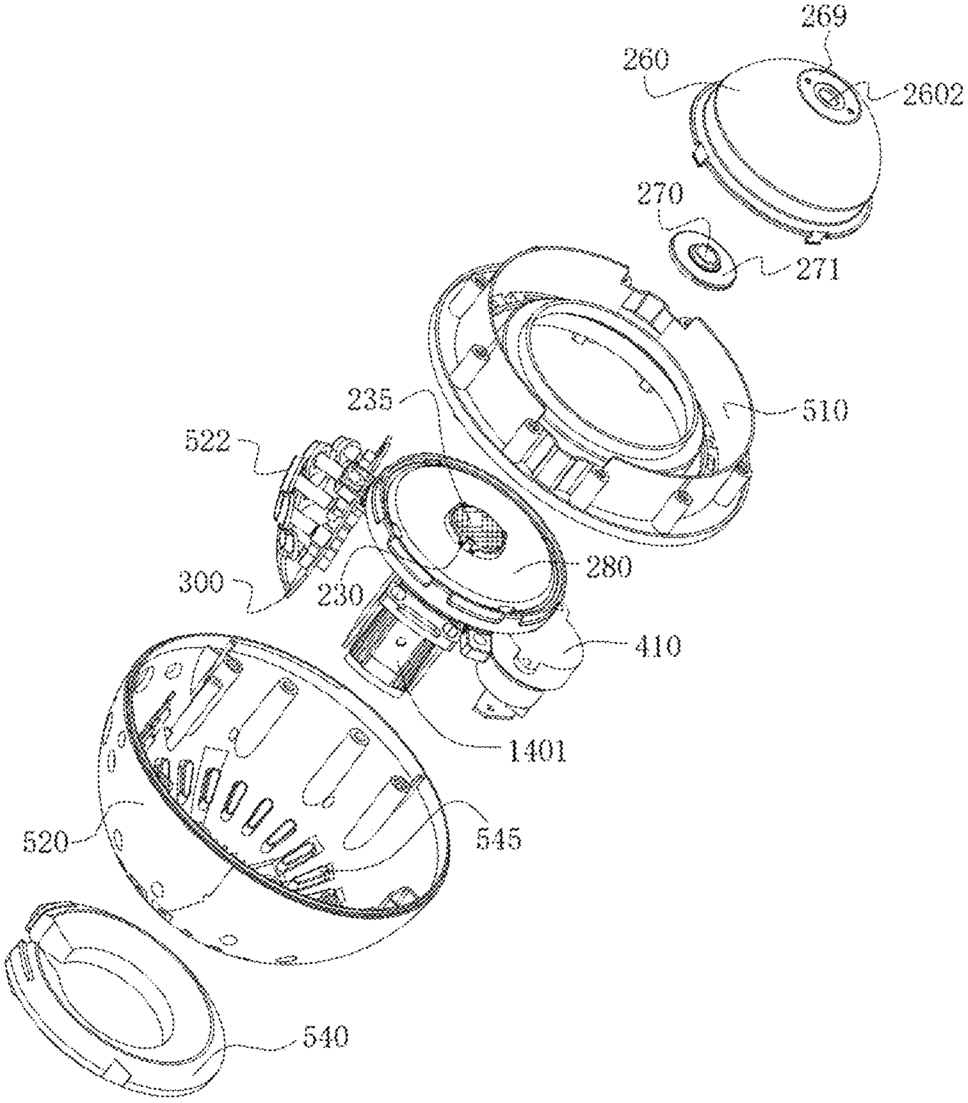
FIG. 19 is an explosion schematic diagram of the eleventh embodiment of the projection device.
Figure 20:
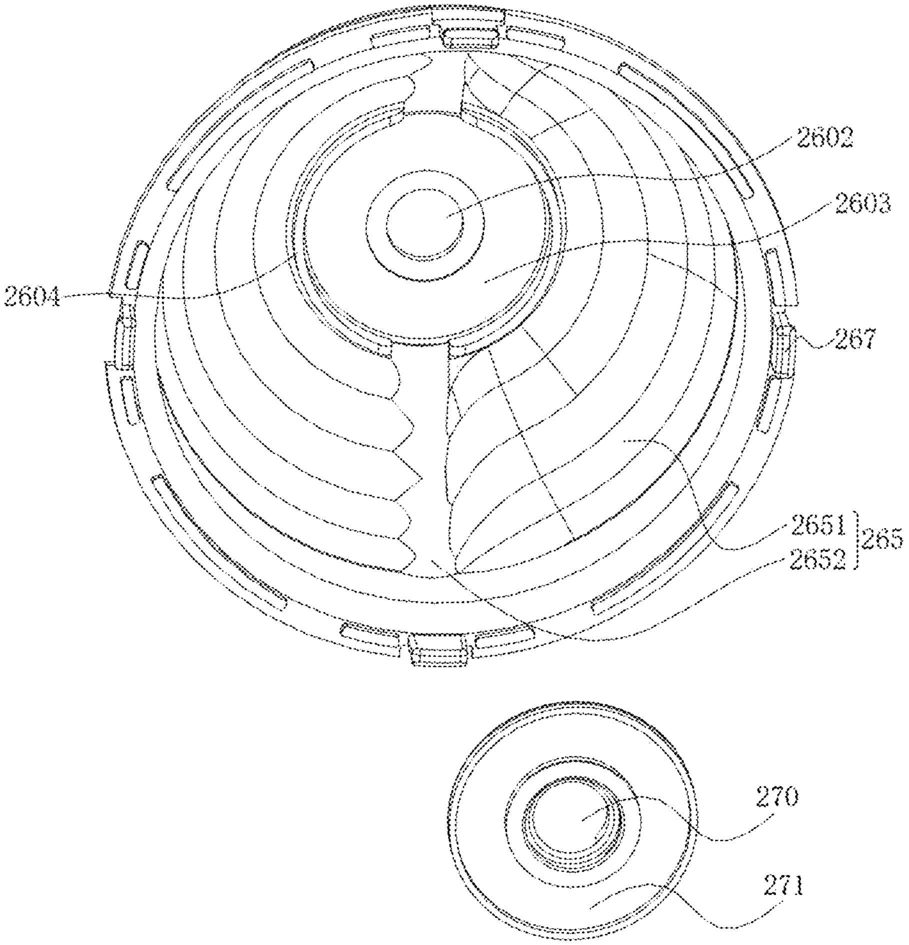
FIG. 20 is a schematic diagram of the installation of diffractive optical elements and nebula lenses.

As shown in FIG. 18 to FIG. 20, it is the eleventh embodiment of starry sky projection device, which includes a nebula lens 260 with a nebula pattern 265 and a variation part 269, an auxiliary lens 230 with an auxiliary pattern 235, a diffractive optical element 270 arranged on the nebula lens 260, an incoherent light source 130, and a driving module, which includes a driving member 410, a first coherent light source 1401 and a second coherent light source 1402, and an electronic control unit 30.

The projection device also includes an upper shell 500, a lower shell 520 and a base 540. The lower shell 520 is operatively provided with a control button 522 connected to the electronic control unit 300, through which the projection device can be adjusted, including but not limited to switching on and off the projection device, nebula color adjustment, breathing mode adjustment, forward rotation and reverse rotation, etc.

A night lamp cover 505 is arranged on the periphery of the nebula lens 260. The night lamp cover 505 can emit soft light and can be used as a night lamp, an atmosphere lamp and an illumination lamp. The night lamp cover 505 can be controlled independently and can be turned on and off independently.

The lower shell 520 is provided with an indicator lamp 523, which can indicate, including but not limited to, the power switch of the projection device, the adjustment mode, etc. The lower shell 520 is provided with a plurality of heat dissipation holes 545, which communicate the internal space of the lower shell 520 with the outside world and help to dissipate the heat inside the projection device.

The projection device also includes a wireless module 525, which can cooperate with a controller to realize remote control.

As shown in FIG. 18 to FIG. 20, the nebula lens 260 is provided with an optical element mounting hole 2602, which passes through the nebula lens 260. An optical element mounting surface 2603 is provided in the circumferential direction of the optical element mounting hole 2602, an optical element positioning part 2604 extends in the direction close to the joint part 267 in the circumferential direction of the optical element mounting surface 2603, and an optical element mounting part 271 is provided in the circumferential direction of the diffractive optical element 270. The first coherent light source 1401 is a coherent light source and can generate coherent light irradiated to the diffractive optical element 270.

The optical element mounting portion 271 has an external shape adapted to the optical element mounting surface 2603, which can cover the optical element mounting part 271. In this embodiment, the diffractive optical element 270 is a grating sheet, and the diffractive optical element 270 is fixed to the nebula lens 260 by cold pressing, and the optical element mounting part 271 is fitted to the optical element mounting surface 2603.

In another embodiment, the variation part 269 is not provided with the optical element mounting hole 2602, and the diffractive optical element 270 is directly mounted on the optical element mounting surface 2603, and the variation part 269 adopts a flat and transparent structure, and similar effects can be achieved.

In other embodiments, the diffractive optical element 270 can also be other components that generate light spots after being irradiated by a coherent light source. Besides cold pressing, the diffractive optical element 270 and the optical element can also be fixed by hot melting process, or mechanical clamps can be used to fix them. Adhesives, screws and other ways can also be used for fixed connection.

Figure 21:
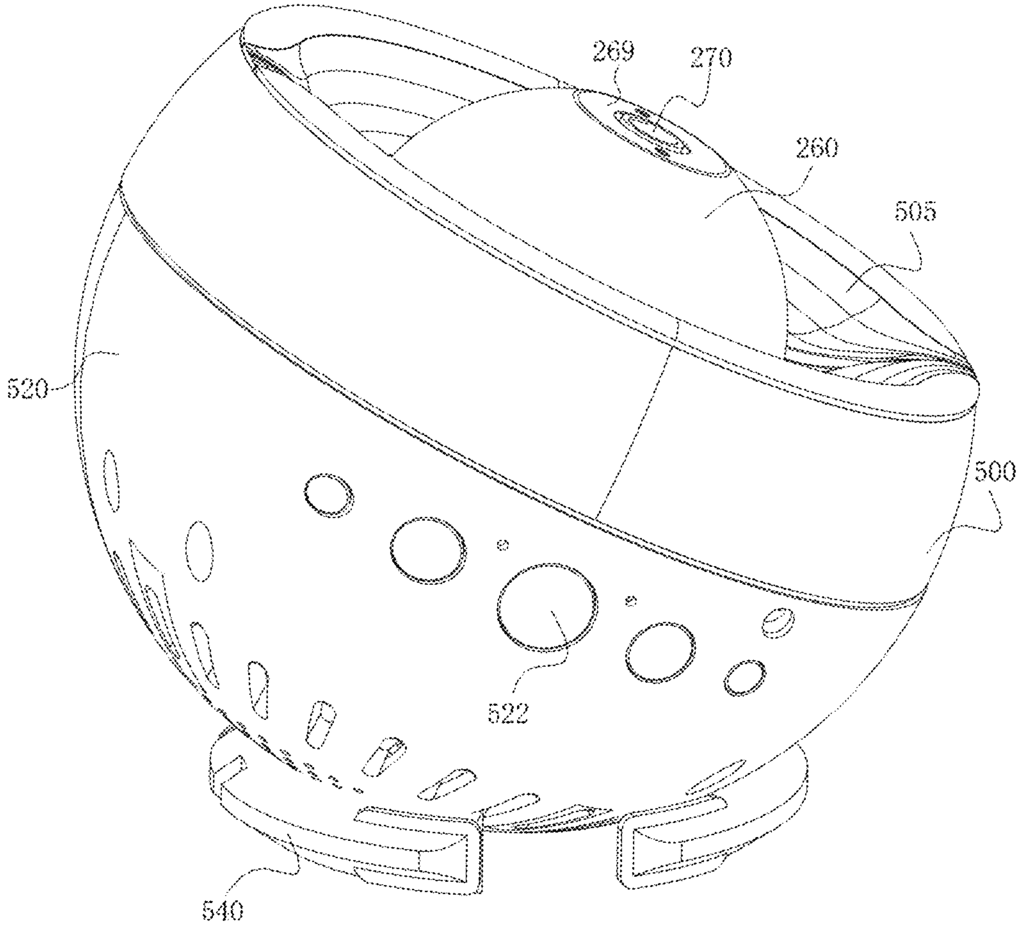
FIG. 21 is a schematic diagram of the projection device deflecting the projection angle.
Figure 22:
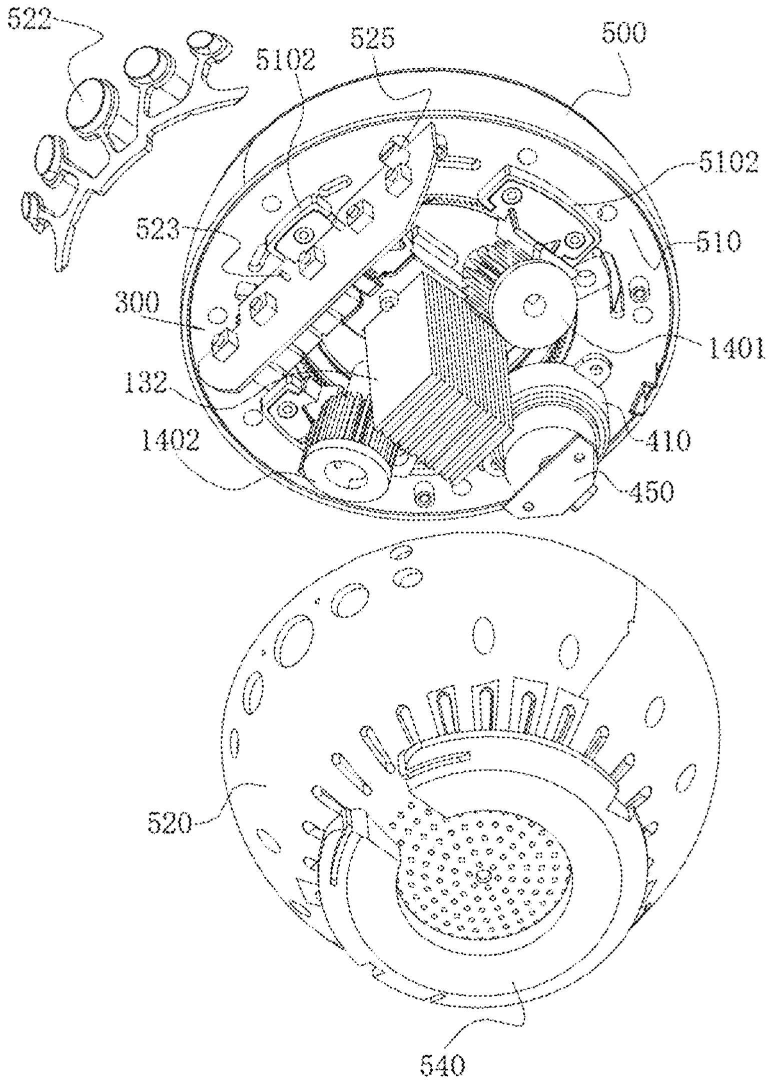
FIG. 22 is a schematic view of each component mounted on the positioning mounting ring from below.
Figure 23:
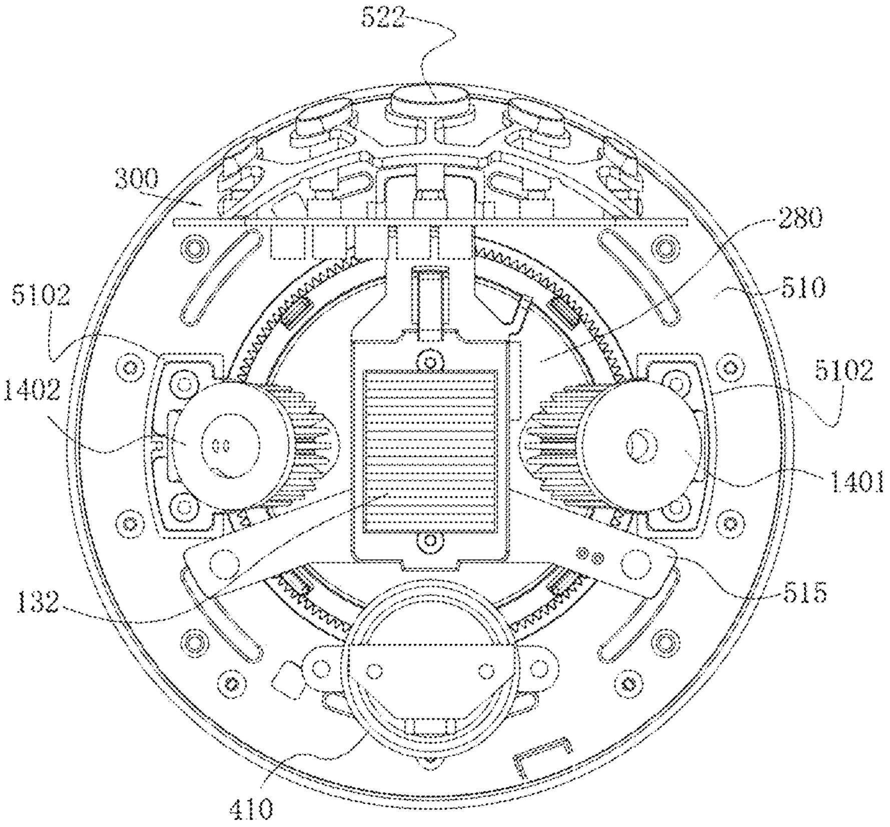
FIG. 23 is a schematic view of each component mounted on the positioning mounting ring from a top view.

As shown in FIG. 18 and FIG. 21, the base 540 can be separated from the lower shell 520. Because the lower shell 520 is semicircular, the base 540 has an arc that fits the surface of the lower shell 520, and the lower shell 520 can deflect at a certain angle on the base 540, thereby changing the projection angle of the projection device.

As shown in FIG. 18, FIG. 19, FIG. 22 and FIG. 23, the positioning mounting ring 510 is provided with a positioning mounting part 5102, which provides mounting space for the first coherent light source 1401, the second coherent light source 1402, the bracket mounting body 515 and the driving member 410, and both the first coherent light source 1401 and the second coherent light source 1402 are coherent light sources.

In this embodiment, the first coherent light source 1401 and the second coherent light source 1402 are monochromatic laser diodes, and the two monochromatic laser diodes can generate coherent light with different colors, but they are not limited thereto. In other embodiments, they can be in other numbers, so that the generated stars have more numbers and colors.

The electronic control unit 300 is provided with a switch corresponding to the control button 522, and the switch is triggered by the control button 522 to realize corresponding functions, including but not limited to switching the projection device, nebula color adjustment, breathing mode adjustment, forward rotation and reverse rotation, etc.

Figure 24:
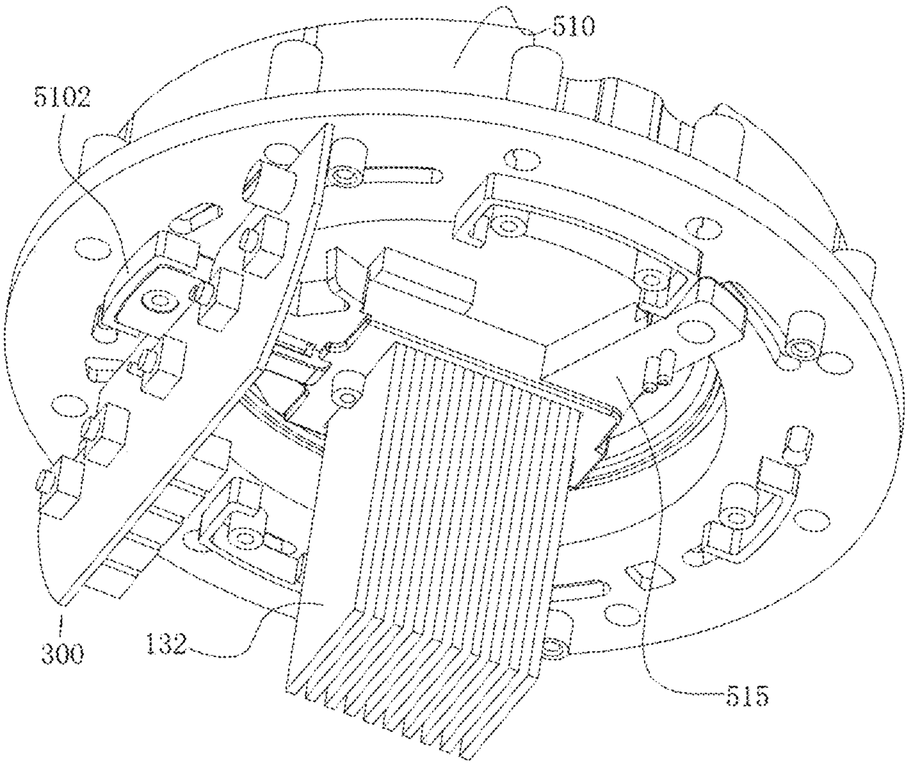
FIG. 24 is a schematic diagram of the mounting relationship between the bracket mounting body and the positioning mounting ring.
Figure 25:
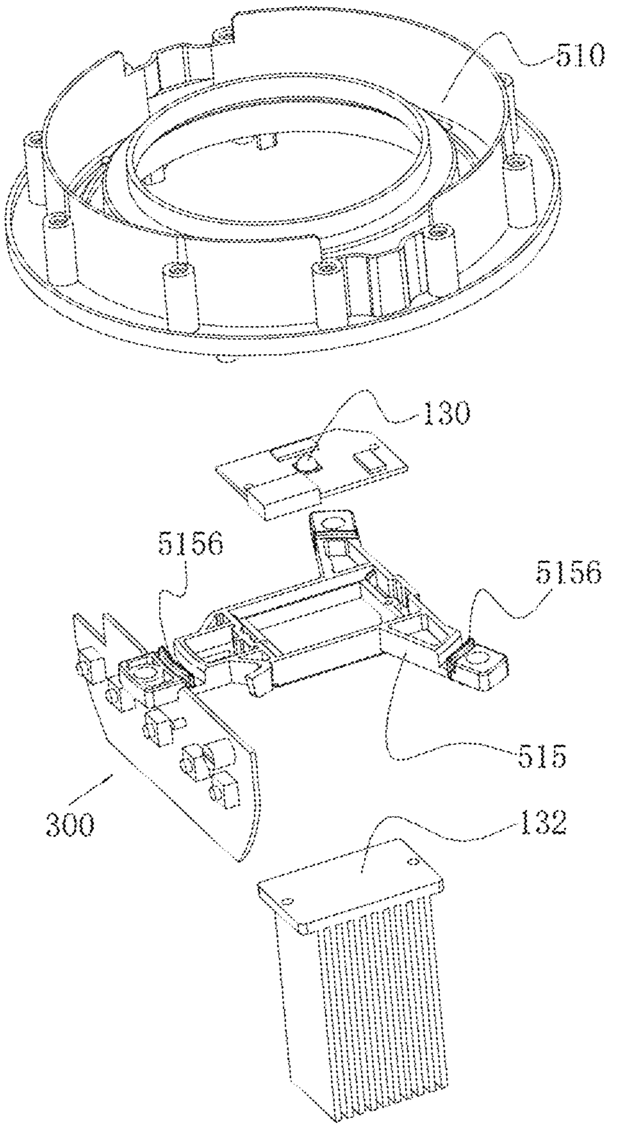
FIG. 25 is an explosion schematic diagram of the installation relationship between the bracket installation body and the positioning installation ring.
Figure 26:
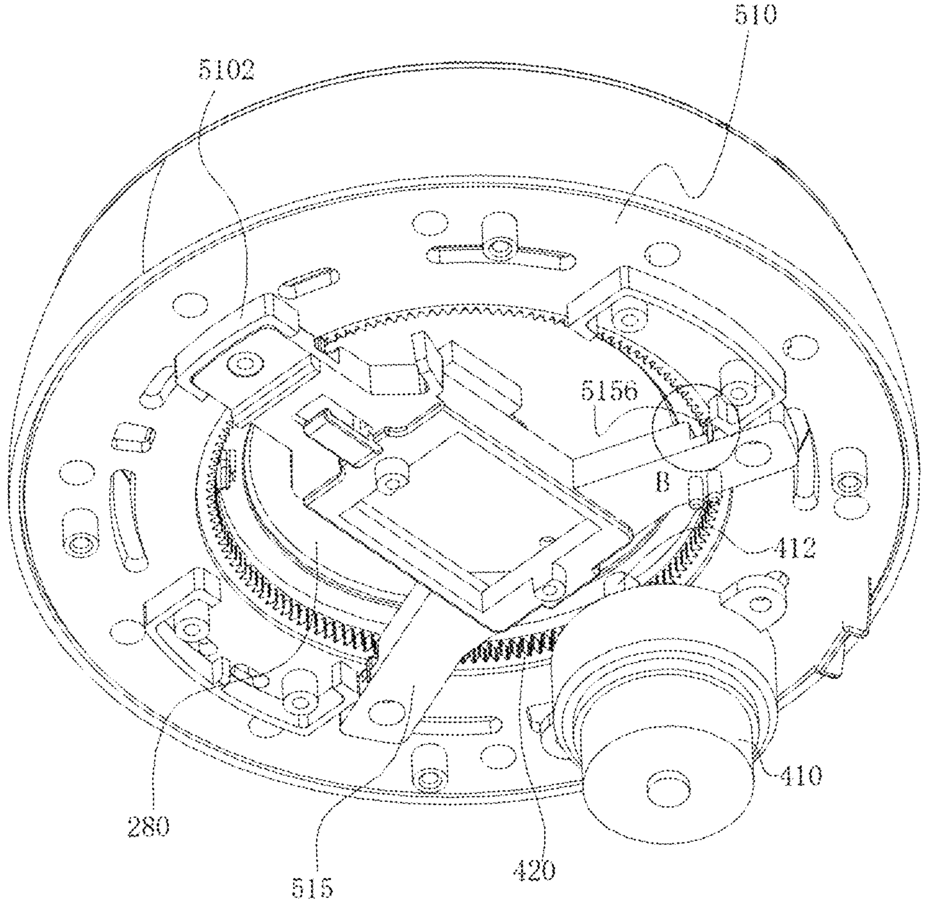
FIG. 26 is a schematic view of the holder mounting body supporting the lens base from below.
Figure 27:
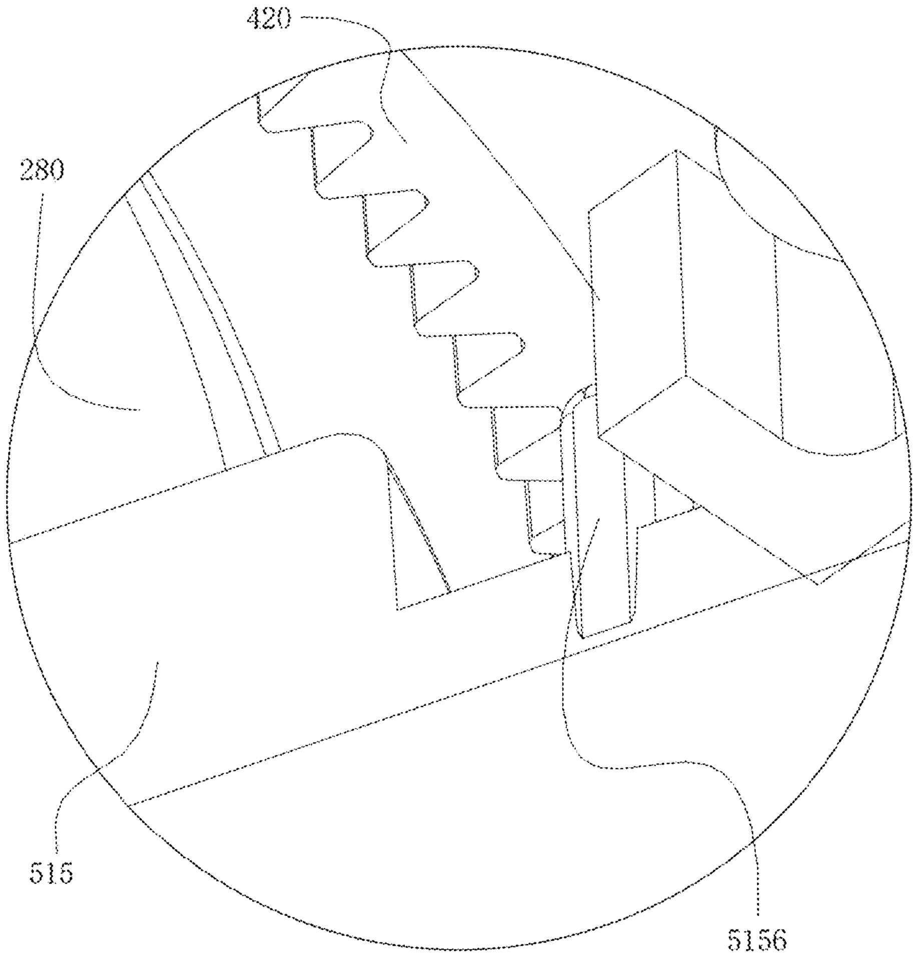
FIG. 27 is a partially enlarged schematic view at B in FIG. 26.

As shown in FIGS. 24 and 25, the bracket mounting body 515 is mounted on the positioning mounting ring 510 through the positioning mounting part 5102, and the incoherent light source 130 and the radiator 132 are mounted on the bracket mounting body 515.

The radiator 132 is installed at the back of the incoherent light source 130 to help dissipate heat generated by the incoherent light source 130.

As shown in FIG. 19, FIG. 25 to FIG. 27, the lens base 280 is positioned in the positioning mounting ring 510, and the lens base 280 is circumferentially provided with a mating part 420 that can mate with the driving member 410. There is a certain gap between the lens base 280 and the positioning mounting ring 510, so that the lens base 280 can be smoothly driven to rotate by the driving member 410. A base supporting part 5156 is provided on the bracket mounting body 515, the base support part 5156 supports the lens base 280, and the base support part 5156 is made of wear-resistant material because the lens base 280 will generate friction loss when rotating.

In this embodiment, the driving member 410 is a motor, the power source of the driving member 410 is electric energy, the mating part 420 is an internal gear, the driving member 410 has an output end 412, and gear transmission is adopted between the output end 412 and the mating part 420.

Because the nebula lens 260 is fixedly connected with the auxiliary lens 230 through the lens base 280. When the driving member 410 drives the lens base 280 to rotate, it will drive the nebula lens 260 to rotate. When the nebula lens 260 rotates, the light emitted by the incoherent light source 130 will generate different dynamic changes due to the existence of the nebula pattern 265. When the auxiliary lens 230 rotates, the light emitted by the incoherent light source 130 will generate different dynamic changes again due to the existence of the auxiliary pattern 235. Therefore, the nebula in this embodiment has dual rotation dynamics, and the projected nebula has rich dynamic effects.

In another embodiment, only the nebula lens 260 rotates, and the nebula generates a dynamic change based on the rotation of the nebula lens 260.

In another embodiment, only the auxiliary lens 230 rotates, and the nebula generates a dynamic change based on the rotation of the auxiliary lens 230.

In other embodiments, chain transmission, belt transmission, hydraulic transmission, pneumatic transmission and other transmission modes can be adopted between the driving member 410 and the mating part 420.

In other embodiments, the driving member 410 can also be an internal combustion engine or a steam engine, and the power source of the driving member 410 can be chemical energy, wind power transmission, water power, manpower, heat energy and magnetic force.

In another embodiment, by setting a movable structure between the electronic control unit 300 and the incoherent light source 130, the electronic control unit 300 can change the angle of the light generated by the incoherent light source 130 by controlling the movable structure, and the nebula will produce triple dynamic effects due to the changes of the angle and the lens rotation.

In this embodiment, the auxiliary lens 230 is installed between the nebula lens 260 and the incoherent light source 130, and the light emitted by the incoherent light source 130 passes through the auxiliary lens 230 and then through the nebula lens 260, so the light path in this embodiment is approximately linear (regardless of the deflection phenomenon when the light passes through the lens).

In another embodiment, the projection device also includes at least one layer of a reflective material, which is arranged on one side of the auxiliary lens 230, and the nebula lens 260 and the incoherent light source 130 are arranged on the other side of the auxiliary lens 230. The nebula lens 260, the incoherent light source 130 and the auxiliary lens 230 are distributed in a triangle, but not in a straight line. The light emitted by the incoherent light source 130 first passes through the auxiliary lens 230 and irradiates the reflective material, and after being reflected by the reflective material, it passes through the auxiliary lens 230 and finally passes through the nebula lens 260. At this time, the optical path presents several broken lines.

In this embodiment, the diffractive optical element 270 is a circular grating sheet, which can be a grating sheet with other polygonal structures such as square, rectangle, trapezoid, triangle, etc. The diffractive optical element 270 can also be a grating disk, and the number of diffractive optical elements 270 can be more than one.

In this embodiment, the first coherent light source 1401 and the second coherent light source 1402 are installed at a certain angle with the rotation axis of the nebula lens 260, so that coherent light generated by the coherent light sources obliquely irradiates the diffractive optical element 270. In another embodiment, the first coherent light source 1401 and the second coherent light source 1402 are installed at a parallel angle to the rotation axis of the nebula lens 260, so that coherent light generated by the coherent light sources vertically irradiates the diffractive optical element 270.

The terms “comprising,” “including,” “having,” and the like are synonymous and are used inclusively, in an open-ended fashion, and do not exclude additional elements, features, acts, operations, and so forth. Also, the term “or” is used in its inclusive sense (and not in its exclusive sense) so that when used, for example, to connect a list of elements, the term “or” means one, some, or all of the elements in the list. The use of “adapted to” or “configured to” herein is meant as open and inclusive language that does not foreclose devices adapted to or configured to perform additional tasks or steps. Additionally, the use of “based on” is meant to be open and inclusive, in that a process, step, calculation, or other action “based on” one or more recited conditions or values may, in practice, be based on additional conditions or values beyond those recited. Similarly, the use of “based at least in part on” is meant to be open and inclusive, in that a process, step, calculation, or other action “based at least in part on” one or more recited conditions or values may, in practice, be based on additional conditions or values beyond those recited. Headings, lists, and numbering included herein are for ease of explanation only and are not meant to be limiting.

The various features and processes described above may be used independently of one another or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

The invention has now been described in detail for the purposes of clarity and understanding. However, those skilled in the art will appreciate that certain changes and modifications may be practiced within the scope of the appended claims.

Conditional language used herein, such as, among others, “can,” “could,” “might,” “may,” “e.g.,” and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

What is claimed is:

1. A nebula lens, comprising at least one main structure and at least one opening arranged on said main structure, wherein said main structure is a rotating body, and said main structure has at least one outer surface and at least one inner surface; and said main structure has a tendency to protrude away from said opening, said inner surface defines at least one cavity, and said outer surface defines at least one light-emitting area, and said light-emitting area faces away from said opening; and said main structure is provided with at least one layer of nebula pattern and at least one variation part, and said variation part defines at least one variation area, and said variation area faces away from said opening; and said variation area generates image changes different from said light-emitting area.

2. The nebula lens according to claim 1, wherein a light transmittance of said variation part is different from that of said main structure.

3. The nebula lens according to claim 1, wherein said variation part is provided with at least one variation member.

4. The nebula lens according to claim 1, wherein said variation part has a curvature different from that of said main structure, said outer surface is smooth, said nebula pattern is arranged on said inner surface, and said variation part does not contain nebula pattern.

5. The nebula lens according to claim 1, wherein said light-emitting area covers said variation area, and the image changes generated by said variation area are superimposed in said light-emitting area.

6. A starry sky projection device with a nebula lens, comprising at least one nebula lens, at least one incoherent light source and at least one coherent light source, wherein said nebula lens is provided with at least one diffractive optical element; and wherein said incoherent light source generates incoherent light, which irradiates said nebula lens, and said coherent light source generates coherent light, which irradiates said diffractive optical element; and said nebula lens comprises at least one main structure and at least one opening arranged on said main structure, wherein said main structure is a rotating body and has at least one outer surface and at least one inner surface; and said main structure has a tendency to protrude away from said opening, said inner surface defines at least one cavity, and said outer surface defines at least one light-emitting area, and said light-emitting area faces away from said opening; and said main structure is provided with at least one layer of nebula pattern and at least one variation part, and said variation part defines at least one variation area, which faces away from said opening and generates image changes different from said light-emitting area.

7. The starry sky projection device with a nebula lens according to claim 6, further comprising at least one driving module which drives said nebula lens to rotate around at least one rotation axis.

8. The starry sky projection device with a nebula lens according to claim 7, further comprising at least one auxiliary lens, wherein said auxiliary lens has a center; said auxiliary lens is provided with at least one convex surface, and said convex surface has a tendency of protruding away from said center, and said auxiliary lens is provided with at least one layer of auxiliary pattern; and said incoherent light first passes through said auxiliary lens and then passes through said nebula lens and said driving module drives said auxiliary lens and said nebula lens to rotate around at least one rotation axis.

9. The starry sky projection device with a nebula lens according to claim 8, wherein said auxiliary lens further has at least one lens surface, said lens surface is located above said convex surface, and said auxiliary pattern is arranged on said lens surface.

10. The starry sky projection device with a nebula lens according to claim 9, further comprising at least one lens base, wherein said lens base is fixedly connected with said nebula lens and said auxiliary lens; and said nebula lens is provided with an optical element mount hole, that variation part covers said optical element mounting hole, said optical element mount hole penetrates through said nebula lens, at least one optical element mounting surface is arranged in a circumferential direction of said optical element mounting hole, and at least one optical element mounting part is arranged in a circumferential direction of said diffractive optical element, and said optical element mounting part has a shape matched with said optical element mounting surface; and said optical element mounting surface covers said optical element mounting part, and said diffractive optical element is fixed on said nebula lens.

11. The starry sky projection device with a nebula lens according to claim 6, further comprising at least one power supply unit and at least one electronic control unit, wherein said power supply unit is an energy source for said electric control unit, said incoherent light source and said coherent light source, and said electronic control unit controls said coherent light source and said incoherent light source.

12. The starry sky projection device with a nebula lens according to claim 10, further comprising at least one power supply unit and at least one electronic control unit, wherein said power supply unit is an energy source for said electronic control unit, said driving module, said incoherent light source and said coherent light source, and said electronic control unit controls said driving module, said coherent light source and said incoherent light source.

13. The starry sky projection device with a nebula lens according to claim 12, further comprising at least one shell and at least one base, wherein said shell comprises at least one lower shell and at least one upper shell, and said base has at least one surface attached to said lower shell, and said lower shell is fixedly connected with said upper shell, and said shell provides installation space for said coherent light source, said incoherent light source, said auxiliary lens, said nebula lens and said diffractive optical element, and said lower shell is provided with at least one heat dissipation hole; and said electronic control unit comprises at least one wireless module, and said wireless module cooperates with a controller to realize remote control of said starry sky projection device.

14. The starry sky projection device with a nebula lens according to claim 13, further comprising at least one radiator and at least one night lamp cover, wherein said radiator conducts heat generated by said incoherent light source, said night lamp cover is arranged around said nebula lens, and said night lamp cover emits light independently.

15. The starry sky projection device with a nebula lens according to claim 8, wherein said driving module comprises at least one driving member and at least one differential member, and said differential member is respectively connected with said nebula lens and said auxiliary lens; and said driving module is connected with said differential member, so that said nebula lens and said auxiliary lens rotate around at least one rotation axis at different speeds.

16. The starry sky projection device with a nebula lens according to claim 8, wherein said driving module comprises at least one first driving part and at least one second driving part, wherein said first driving part is connected with said nebula lens, and said second driving part is connected with said auxiliary lens, so that said nebula lens and said auxiliary lens rotate around at least one rotation axis at different speeds.

17. A method for generating starry sky, comprising providing at least one nebula lens and at least one incoherent light source, wherein said incoherent light source generates incoherent light, and said incoherent light irradiates said nebula lens, and said nebula lens comprises at least one main structure and at least one opening arranged on said main structure, wherein said main structure is a rotating body, and said main structure has at least one outer surface and at least one inner surface; said main structure has a tendency to protrude away from said opening, said inner surface defines at least one cavity, and said outer surface defines at least one light-emitting area; said light-emitting area faces away from said opening, said main structure is provided with at least one layer of nebula pattern and at least one variation part; said variation part defines at least one variation area, said variation area faces away from said opening, and said variation area generates image changes different from said light-emitting area; and the method for generating starry sky comprises the following steps:

activating said incoherent light source to generate said incoherent light;

irradiating said incoherent light to said nebula pattern and said variation part;

passing said incoherent light through said nebula lens; and irradiating said incoherent light to a surface of a projected object to form a starry sky composed of varied nebulae.

18. The method for generating starry sky according to claim 17, further comprising at least one diffractive optical element and at least one coherent light source, wherein said diffractive optical element is on said nebula lens, and said coherent light source generates coherent light that irradiates said diffractive optical element, thereby forming a starry sky composed of nebulae and stars with variations.

19. The method for generating starry sky according to claim 18, further comprising at least one driving module which drives said nebula lens to rotate around at least one rotation axis, so that said starry sky is dynamic.

20. The method for generating starry sky according to claim 19, further comprising at least one auxiliary lens, which has a center and is provided with at least one convex surface, and said convex surface has a tendency of protruding away from said center, and said auxiliary lens is provided with at least one layer of auxiliary pattern; and said incoherent light first passes through said auxiliary lens and then passes through said nebula lens, and said driving module drives said auxiliary lens and said nebula lens to rotate around at least one rotation axis.

* * * * *